(12) United States Patent
Tamida et al.

(10) Patent No.: US 12,224,677 B2
(45) Date of Patent: Feb. 11, 2025

(54) POWER SOURCE DEVICE

(71) Applicant: Mitsubishi Electric Corporation, Tokyo (JP)

(72) Inventors: Taichiro Tamida, Tokyo (JP); Shingo Tsuda, Tokyo (JP); Daisuke Takauchi, Tokyo (JP); Takashi Kumagai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 68 days.

(21) Appl. No.: 18/265,691

(22) PCT Filed: Jan. 27, 2021

(86) PCT No.: PCT/JP2021/002828
§ 371 (c)(1),
(2) Date: Jun. 7, 2023

(87) PCT Pub. No.: WO2022/162785
PCT Pub. Date: Aug. 4, 2022

(65) Prior Publication Data
US 2024/0039419 A1 Feb. 1, 2024

(51) Int. Cl.
*H02M 7/48* (2007.01)
*H02J 3/00* (2006.01)
(Continued)

(52) U.S. Cl.
CPC .............. *H02M 5/293* (2013.01); *H02J 3/00* (2013.01); *H02M 7/4818* (2021.05); *H02M 7/5387* (2013.01); *H02M 7/539* (2013.01)

(58) Field of Classification Search
CPC ........ H02M 1/12; H02M 1/123; H02M 1/126; H02M 1/14; H02M 1/143; H02M 1/15;
(Continued)

(56) References Cited

U.S. PATENT DOCUMENTS

| 5,541,829 A * | 7/1996 | Maehara | ........... H02M 7/53803 |
| | | | 363/37 |
| 2004/0090803 A1* | 5/2004 | Kerstetter | ............. H02M 1/126 |
| | | | 363/39 |

(Continued)

FOREIGN PATENT DOCUMENTS

| JP | 2001-035693 A | 2/2001 |
| JP | 2009-063830 A | 3/2009 |

(Continued)

OTHER PUBLICATIONS

International Search Report and Written Opinion mailed on Apr. 13, 2021, received for PCT Application PCT/JP2021/002828, filed on Jan. 27, 2021, 9 pages including English Translation.

*Primary Examiner* — Scott Bauer
*Assistant Examiner* — Shahzeb K Ahmad
(74) *Attorney, Agent, or Firm* — XSENSUS LLP

(57) ABSTRACT

A power source device includes a capacitive load; and an AC power source, as a voltage source, which applies AC voltage to the capacitive load. A series circuit composed of an inductor and a capacitor is connected to the AC power source. A series circuit composed of a load inductor and the capacitive load is connected in parallel to one of the inductor or the capacitor. If an inductance of the inductor is defined as Lp, a capacitance of the capacitor is defined as Cp, an inductance of the load inductor is defined as Ls, an equivalent capacitance of the capacitive load is defined as Cs, and a frequency of the AC power source is defined as fv, the following expressions are satisfied, $0.8/((2\pi \cdot fv)^2) < Lp \cdot Cp < 1.2/((2\pi \cdot fv)^2)$ $0.8/((2\pi \cdot fv)^2) < Ls \cdot Cs < 1.2/((2\pi \cdot fv)^2)$.

9 Claims, 22 Drawing Sheets

(51) Int. Cl.
*H02M 5/293* (2006.01)
*H02M 7/5387* (2007.01)
*H02M 7/539* (2006.01)

(58) Field of Classification Search
CPC ........ H02M 3/00; H02M 3/156; H02M 3/158;
H02M 5/06; H02M 5/293; H02M 5/40;
H02M 5/45; H02M 7/42; H02M 7/48;
H02M 7/4818; H02M 7/538; H02M
7/5387; H02M 7/539; H02J 3/00
See application file for complete search history.

(56) References Cited

U.S. PATENT DOCUMENTS

| | | |
|---|---|---|
| 2007/0205727 A1 | 9/2007 | Tamita et al. |
| 2009/0067867 A1 | 3/2009 | Yamashita et al. |
| 2011/0080230 A1* | 4/2011 | Fukuda .................. H03F 1/306 333/181 |
| 2011/0163071 A1* | 7/2011 | Hashimoto ............ B23H 1/022 219/69.13 |
| 2018/0063891 A1 | 3/2018 | Imai et al. |
| 2018/0145608 A1* | 5/2018 | Lin ......................... H02M 7/53 |

FOREIGN PATENT DOCUMENTS

| | | | | |
|---|---|---|---|---|
| JP | 2011090997 A | * | 5/2011 | |
| JP | 2018-032619 A | | 3/2018 | |
| JP | 2019165628 A | * | 9/2019 | .......... H02M 3/1588 |
| WO | 2005/094138 A1 | | 10/2005 | |

* cited by examiner

POWER SOURCE DEVICE

CROSS-REFERENCE TO RELATED APPLICATION

The present application is based on PCT filing PCT/JP2021/002828, filed Jan. 27, 2021, the entire contents of which are incorporated herein by reference.

TECHNICAL FIELD

The present disclosure relates to a power source device.

BACKGROUND ART

Dielectric barrier discharge is industrially applied in ozonizers and the like. However, since electric discharge needs to be caused, high voltage having an AC waveform needs to be applied to an outside portion including a dielectric. In addition, the frequency is high so as to be in a range from kHz to MHz and inflicts significant influence on the performance of the load. Thus, a drive circuit that efficiently applies high voltage having a high frequency to the barrier discharge load is necessary.

A power source device has been disclosed which, in order to drive an ozonizer as a capacitive load by an inverter, has an inductor provided in series and is designed such that the inductor and an equivalent capacitance of the ozonizer are resonated with an inverter frequency (for example, Patent Document 1).

CITATION LIST

Patent Document

Patent Document 1: International Publication WO2005/094138

SUMMARY OF THE INVENTION

Problems to be Solved by the Invention

However, in order to appropriately operate the ozonizer, the power source voltage has a lower limit value, and a circuit constant of the ozonizer as a capacitive load is determined according to design of the ozone generator.

Consequently, the device in Patent Document 1 has a problem that the quality factor of the resonance circuit cannot be sufficiently increased.

The present disclosure has been made to solve the above problem, and an object of the present disclosure is to make it possible to freely design the quality factor of a resonance circuit and increase the boost ratio so that high voltage for driving a capacitive load is generated without using any transformer.

Solution to the Problems

A first power source device according to the present disclosure is a power source device including a capacitive load having an equivalent capacitor and an equivalent resistor; and an AC power source which applies AC voltage to the capacitive load. The power source device is such that a series circuit composed of a first inductor and a first capacitor is connected to the AC power source, and a series circuit composed of a load inductor and the capacitive load is connected in parallel to one of the first inductor or the first capacitor; or a parallel circuit composed of the first inductor and the first capacitor is connected to the AC power source, and a parallel circuit composed of the load inductor and the capacitive load is connected in series to one of the first inductor or the first capacitor. The power source device has a configuration in which, if an inductance of the first inductor is defined as Lp, a capacitance of the first capacitor is defined as Cp, an inductance of the load inductor is defined as Is, an equivalent capacitance of the capacitive load is defined as Cs, and a frequency of the AC power source is defined as fv, the following expression (1) and expression (2) are satisfied, $$0.8/((2\pi \cdot fv)^2) < Lp \cdot Cp < 1.2/((2\pi \cdot fv)^2) \quad (1)$$

$$0.8/((2\pi \cdot fv)^2) < Ls \cdot Cs < 1.2/((2\pi \cdot fv)^2) \quad (2).$$

A second power source device according to the present disclosure is a power source device including an inductive load having an equivalent inductor and an equivalent resistor; and an AC power source which applies AC voltage to the inductive load. The power source device is such that a parallel circuit composed of a first inductor and a first capacitor is connected to the AC power source, and a parallel circuit composed of a load capacitor and the inductive load is connected in series to one of the first inductor or the first capacitor; or a series circuit composed of the first inductor and the first capacitor is connected to the AC power source, and a series circuit composed of the load capacitor and the inductive load is connected in parallel to one of the first inductor or the first capacitor. The power source device has a configuration in which, if an inductance of the first inductor is defined as Lp, a capacitance of the first capacitor is defined as Cp, a capacitance of the load capacitor is defined as Cs, an inductance of the inductive load is defined as Ls, and a frequency of the AC power source is defined as fv, the following expression (1) and expression (2) are satisfied, $$0.8/((2\pi \cdot fv)^2) < Lp \cdot Cp < 1.2/((2\pi \cdot fv)^2) \quad (1)$$

$$0.8/((2\pi \cdot fv)^2) < Ls \cdot Cs < 1.2/((2\pi \cdot fv)^2) \quad (2).$$

A third power source device according to the present disclosure is a power source device including a capacitive load having an equivalent capacitor and an equivalent resistor: and an AC power source which applies AC voltage to the capacitive load. A series circuit composed of a first inductor and a first capacitor is connected to the AC power source. With "n" being an integer not smaller than 2, a series circuit composed of an n-th inductor and an n-th capacitor is connected in parallel to one of an (n−1)-th inductor or an (n−1)-th capacitor, and a series circuit composed of a load inductor and the capacitive load is connected in parallel to one of the n-th inductor or the n-th capacitor. The power source device has a configuration in which a resonance frequency of the first inductor and the first capacitor, a resonance frequency of a second inductor and a second capacitor, . . . , a resonance frequency of the n-th inductor and the n-th capacitor, and a resonance frequency of the load inductor and the capacitive load match each other, and a frequency of the AC power source matches each of the resonance frequencies.

Effect of the Invention

In the first and third power source devices according to the present disclosure, the quality factor of a resonance circuit can be freely designed, and the boost ratio can be increased so that high voltage for driving the capacitive load can be generated without using any transformer.

In the second power source device according to the present disclosure, the quality factor of the resonance circuit can be freely designed, and the current amplification ratio can be increased so that high current for driving the inductive load can be generated without using any transformer.

DESCRIPTION OF EMBODIMENTS

Embodiment 1

Figure 1:
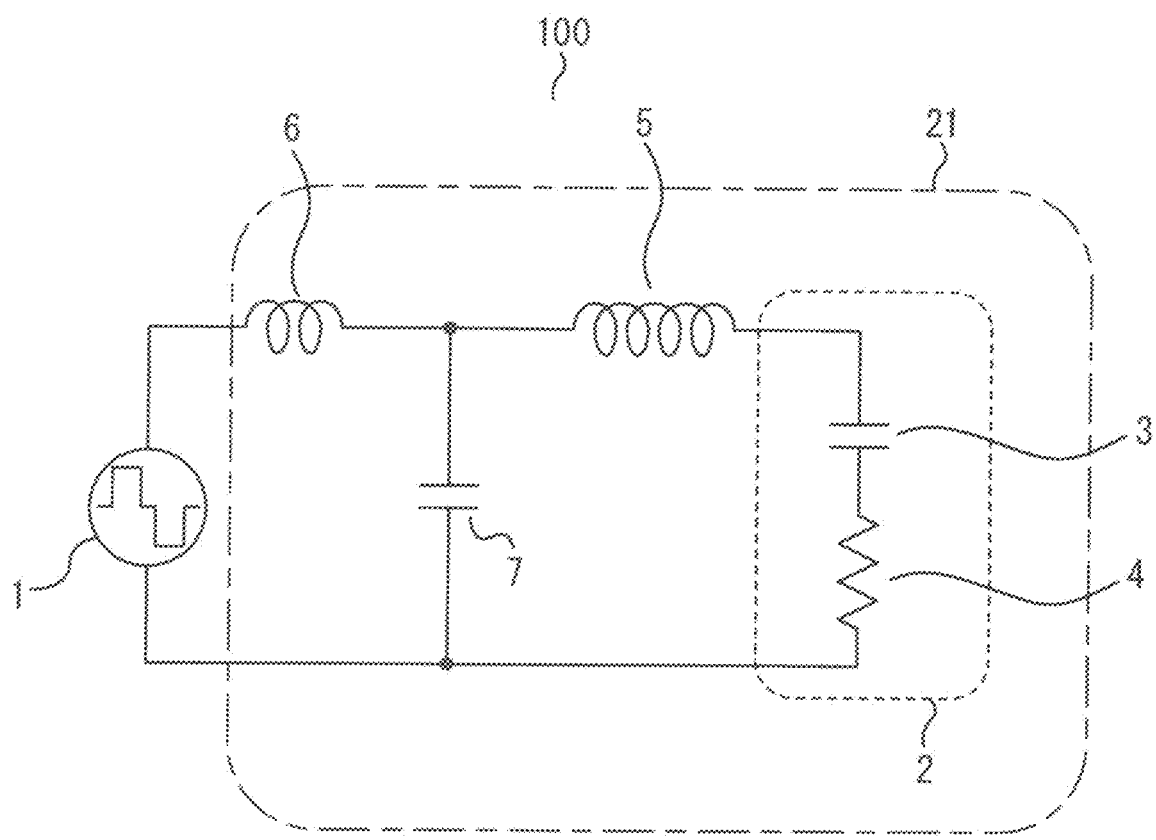
FIG. 1 is a configuration diagram of a power source device in which a capacitive load is driven by an AC voltage source and a series resonance circuit, according to embodiment 1.

Embodiment 1 relates to a power source device including a capacitive load; and an AC power source, as a voltage source, which applies AC voltage to the capacitive load. The power source device has a configuration in which a series circuit composed of a first inductor and a first capacitor is connected to the AC power source; a series circuit composed of a load inductor and the capacitive load is connected in parallel to one of the first inductor or the first capacitor; a resonance frequency of the first inductor and the first capacitor and a resonance frequency of the load inductor and the capacitive load are matched with each other; and a frequency of the AC power source is matched with each of the resonance frequencies.

In embodiment 1, descriptions are given also regarding a case where an inductive load is driven and a case where multiple stages of resonance circuits are formed.

Hereinafter, configurations and operations of the power source device according to embodiment 1 will be described with reference to FIG. 1 to FIG. 3 which are each a configuration diagram of a power source device in which the capacitive load is driven by the AC voltage source and a series resonance circuit; FIG. 4 which is a configuration diagram of a power source device in which two capacitive loads are driven; and FIG. 5 which is a configuration diagram of a power source device in which the capacitive load is driven by the AC voltage source and multiple stages of series resonance circuits.

A basic configuration of a power source device 100 according to embodiment 1 will be described with reference to FIG. 1. In addition, modifications of the power source device 100 in FIG. 1 which is a basic configuration diagram thereof will be described with appropriate reference to FIG. 2 and FIG. 3.

The power source device 100 includes an AC power source 1; a capacitive load 2; a load inductor 5 which forms a resonance circuit together with the capacitive load 2; and furthermore, an inductor 6 and a capacitor 7 which are used for amplifying the quality factor of the resonance circuit.

Here, the inductor 6 and the capacitor 7 are a first inductor and a first capacitor in the claims.

It is noted that the quality factor of the resonance circuit will be described later.

In embodiment 1, the AC power source 1 is a voltage-type AC power source, that is, an AC voltage source. The voltage-type AC power source and a current-type AC power source will be described later.

The capacitive load 2 corresponds to, for example, an ozonizer and a barrier discharge lamp. The capacitive load 2 is a load to be driven by the AC power source 1. An equivalent circuit of the capacitive load 2 is expressed with an equivalent capacitor 3 as a capacitive component; and an equivalent resistor 4 as a resistance component.

Figure 2:
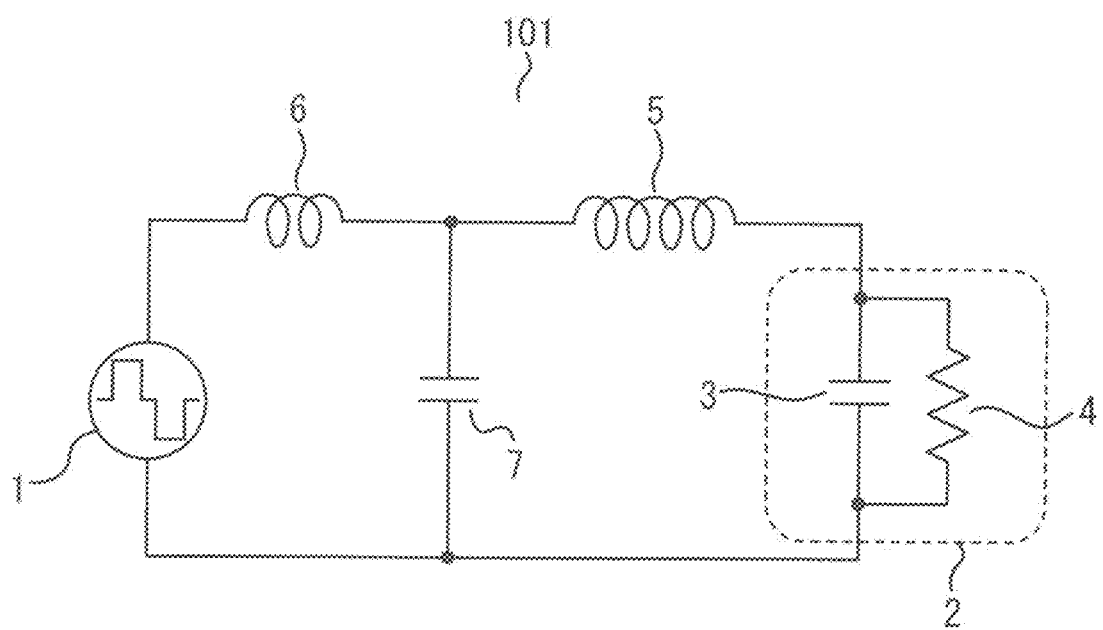
FIG. 2 is another configuration diagram of the power source device in which the capacitive load is driven by the AC voltage source and the series resonance circuit, according to embodiment 1.

Although the equivalent capacitor 3 and the equivalent resistor 4 are expressed as being in series to each other in FIG. 1, there is also a case where it is more appropriate to express the equivalent capacitor 3 and the equivalent resistor 4 as being in parallel to each other as in FIG. 2, for example. In addition, there is also a case where both a resistance component that is in series to the equivalent capacitor 3 and a resistance component that is in parallel to the equivalent capacitor 3 exist.

It is noted that the power source device in FIG. 2 is shown as a power source device 101 to be distinguished from the power source device 100 in FIG. 1.

These cases slightly differ from one another in terms of circuits but do not significantly differ from one another in terms of the manner of handling. Thus, descriptions will be given while the equivalent capacitor 3 and the equivalent resistor 4 of the capacitive load 2 are expressed as being connected in series to each other as in FIG. 1.

Here, an equivalent capacitance of the equivalent capacitor 3 is defined as Cs, and a resistance value of the equivalent resistor 4 is defined as RL.

The equivalent capacitance Cs and the equivalent resistance value RL are determined according to a physical operation of the capacitive load 2 and, in general, fluctuate over time. However, if the equivalent capacitance Cs and the equivalent resistance value RL are treated as in circuits, the average values thereof can be used.

For example, as described in Patent Document 1, the equivalent capacitance Cs or the equivalent resistance value RL defined here are such equivalent average values.

In a case where the capacitive load 2 is driven with series resonance, an inductor is provided in series thereto. The load inductor 5 in FIG. 1 is the inductor for series resonance. Here, an inductance of the load inductor 5 is defined as Ls.

In addition thereto, the inductor 6 and the capacitor 7 are connected in series to the AC power source 1 as in FIG. 1 in the present disclosure. Here, an inductance of the inductor 6 is defined as Lp, and a capacitance of the capacitor 7 is defined as Cp.

A circuit including the capacitive load 2 and further including the inductor 6 (inductance Lp), the capacitor 7 (capacitance Cp), and the load inductor 5 (inductance Ls) which form resonance circuits of the present disclosure, is described as a load circuit 21 in the sense of a load as seen from the AC power source 1.

It is noted that FIG. 2 and the subsequent drawings for embodiment 1 do not show any circuit corresponding to the load circuit 21.

An operational characteristic of the load circuit 21 is that two stages of resonance circuits are present.

Specifically, a first stage of resonance circuit is formed by the inductor 6 and the capacitor 7 connected in series to the AC power source 1. A second stage of resonance circuit is formed by a series circuit that is composed of the capacitive load 2 and the load inductor 5 and that is connected in parallel to the capacitor 7.

Descriptions will be given regarding a case where both a resonance frequency of the first stage of resonance circuit (the series circuit composed of the inductor 6 and the capacitor 7) and a resonance frequency of the second stage of resonance circuit (the series circuit composed of the capacitive load 2 and the load inductor 5; are matched with a frequency fv of the AC power source 1, that is, a case where expression (1) is satisfied. It is noted that the frequency of the AC power source 1 is defined as fv.

$$Ls \cdot Cs = Lp \cdot Cp = 1/((2\pi \cdot fv)^2) \qquad (1)$$

An impedance of the load inductor 5 and an impedance of the equivalent capacitor 3 of the capacitive load 2 are canceled out, and thus the only apparent impedance of the series circuit composed of the load inductor 5, the equivalent resistor 4, and the equivalent capacitor 3 is the equivalent resistance value RL of the equivalent resistor 4.

The circuit in this case is equivalent to a circuit in which the inductor 6 and the capacitor 7 are connected in series to the AC power source 1; and the equivalent resistor 4 is connected in parallel to the capacitor 7.

It is further known from expression (1) that the inductor 6 and the capacitor 7 also satisfy a resonance condition, and thus only the equivalent resistor 4 is apparent from the AC power source 1.

That is, the power factor of the AC power source 1 becomes 1, and the most efficient drive can be performed.

This load circuit 21 is characterized in that the boost ratio thereof can be freely designed. This characteristic will be described.

Here, a case where a series resonance circuit composed of an ordinary inductor (an inductance thereof is defined as L), an ordinary capacitor (a capacitance thereof is defined as C), and an ordinary resistor (a resistance value thereof is defined as R) is driven at a resonance frequency f0 (angular frequency ω0), will be contemplated first. The relationship thereamong is expressed with expression (2).

$$\omega 0 = 2\pi \cdot f0 = 1/(\sqrt{(L \cdot C)}) \qquad (2)$$

The quality factor of the series resonance circuit is expressed with expression (3).

$$Q = (1/R) \cdot (\sqrt{(L/C)}) = (\omega 0 \cdot L)/R = 1/(\omega 0 \cdot C \cdot R) \qquad (3)$$

Here, the capacitive load 2 is a part to be driven, and the equivalent circuit constants thereof, that is, the equivalent capacitance Cs of the equivalent capacitor 3 and the equivalent resistance value RL of the equivalent resistor 4, cannot be changed. Meanwhile, the frequency of the AC power source 1 can be slightly adjusted but cannot be significantly changed since this frequency significantly influences the performance of the capacitive load 2.

Therefore, the quality factor of the resonance circuit composed of the capacitive load 2 and the load inductor 5 is uniquely determined according to expression (3). The quality factor is the maximum value of the boost ratio, that is, the ratio of the voltage of the capacitive load 2 (here, the voltage to be applied to the equivalent capacitor 3) to the power source voltage.

If the frequency of the AC power source 1 is changed from the resonance frequency f0, the boost ratio becomes lower than the quality factor in expression (3). That is, if the frequency of the AC power source 1 is determined on the basis of an operation condition of the capacitive load 2, the quality factor of the resonance circuit composed of the capacitive load 2 and the load inductor 5 is uniquely determined, resulting in determination of the extent to which boosting can be performed by this resonance circuit.

Meanwhile, in the case of a circuit configuration such as one in FIG. 1, addition of the inductor 6 and the capacitor 7 makes it possible to freely design the boost ratio.

Specifically, if load conditions (the capacitance Cs of the equivalent capacitor 3 and the equivalent resistance value RL of the equivalent resistor 4) and a drive condition (the frequency of the AC power source 1) are determined, the value of the inductance Ls of the load inductor 5 is determined according to expression (1) in a resonance condition. Therefore, the quality factor of the resonance circuit composed of the capacitive load 2 and the load inductor 5 cannot be changed.

However, the inductance Lp of the inductor 6 and the capacitance Cp of the capacitor 7 can be freely determined as long as expression (1) is satisfied.

The ratio of the voltage to be applied to the capacitive load 2, that is, the boost ratio, is a product of the boost ratio of the first stage of resonance circuit (the resonance circuit composed of the inductor 6 and the capacitor 7) and the boost ratio of the second stage of resonance circuit (the resonance circuit composed of the capacitive load 2 and the load inductor 5). Thus, the voltage to be applied to the capacitive load 2 can be freely designed.

Figure 3:
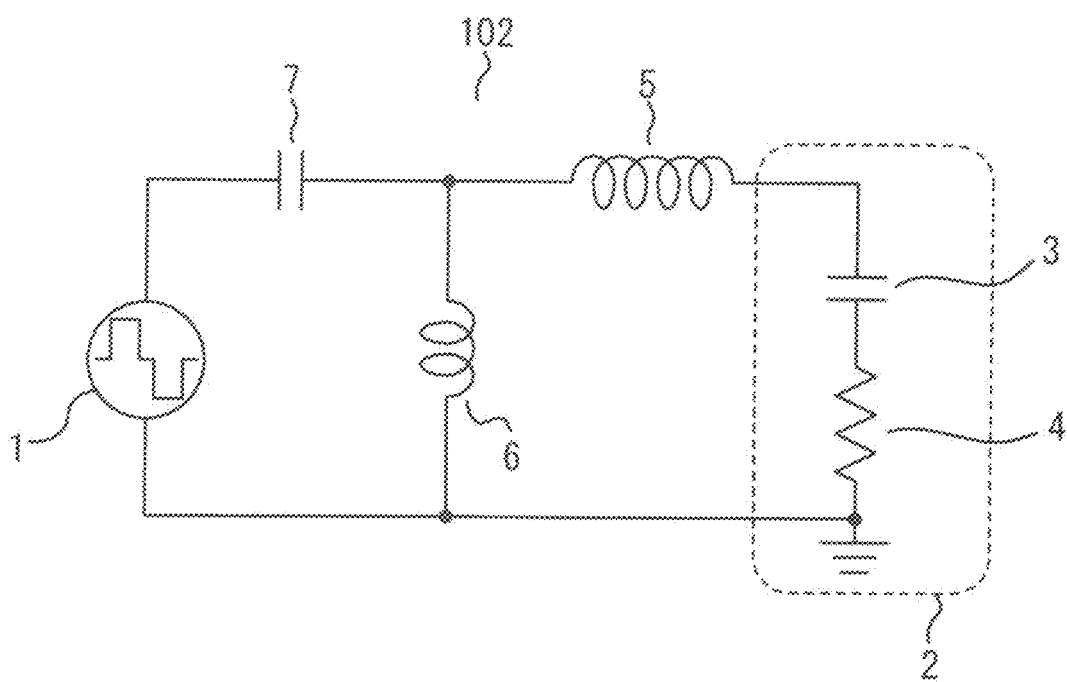
FIG. 3 is another configuration diagram of the power source device in which the capacitive load is driven by the AC voltage source and the series resonance circuit, according to embodiment 1.
Figure 4:
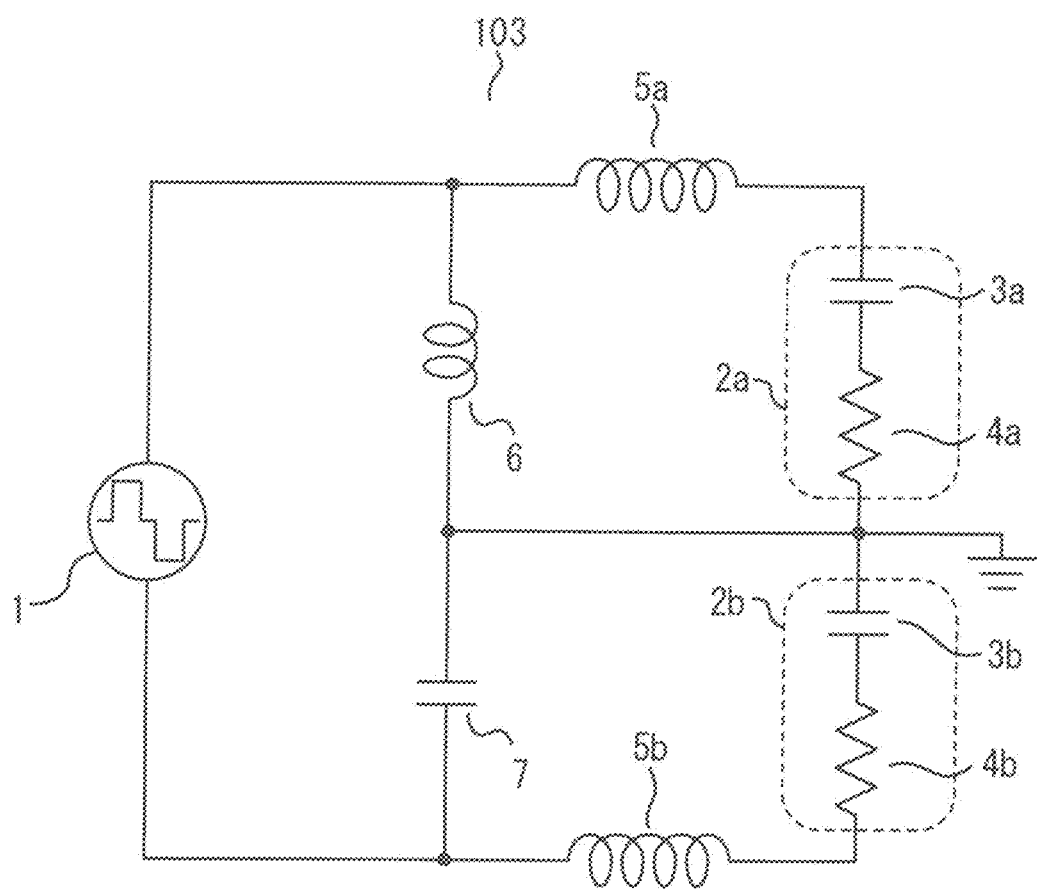
FIG. 4 is a configuration diagram of a power source device in which two capacitive loads are driven by the AC voltage source and the series resonance circuit, according to embodiment 1.

In the circuit in FIG. 1, the inductor 6 and the capacitor 7 in the first stage play equivalent roles under the resonance condition, and thus may be exchanged to obtain a configuration such as one in FIG. 3.

It is noted that the power source device in FIG. 3 is shown as a power source device 102 to be distinguished from the power source device 100 in FIG. 1.

The configuration in FIG. 3 is suitable for a case where the potential on a high-voltage side (the high-voltage side of the capacitive load 2) is desired to be assuredly set to zero when the power source is stopped. In order to express this, in particular, a GND potential is shown in FIG. 3.

Next, a case where two capacitive loads are simultaneously driven by the single AC power source will be described with reference to FIG. 4. Here, the power source device in FIG. 4 is shown as a power source device 103 to be distinguished from the power source device 100 in FIG. 1.

The power source device 103 includes the AC power source 1; two capacitive loads 2a and 2b; load inductors 5a and 5b which form resonance circuits together with the respective capacitive loads 2a and 2b; and furthermore, the inductor 6 and the capacitor 7 which are used for amplifying the quality factors of the resonance circuits.

The capacitive load 2a includes an equivalent capacitor 3a and an equivalent resistor 4a. The capacitive load 2b includes an equivalent capacitor 3b and an equivalent resistor 4b.

Here, the capacitive load 2b and the load inductor 5b are a second capacitive load and a second load inductor in the claims.

In FIG. 4, there is a characteristic that the two capacitive loads 2a and 2b can be simultaneously driven by the single AC power source 1. The capacitive load 2a and the capacitive load 2b may be identical to or different from each other.

If circuit constants differ from each other, it is necessary to design the respective load inductors 5a and 5b for resonances so as to individually satisfy expression (1). The equivalent resistors of the capacitive load 2a and the capacitive load 2b may have different resistance values.)

In the same manner as in the power source device 100 to the power source device 102 described above, GND may be located anywhere in the power source device 103 as well. However, since there are the plurality of capacitive loads 2a and 2b, it is general to locate GND at a connection point between the capacitive load 2a and the capacitive load 2b as shown in FIG. 4.

If the equivalent capacitances of the capacitive load 2a and the capacitive load 2b are equal to each other and the values of the load inductor 5a and the load inductor 5b are equal to each other, a common inductor may be provided to simplify the circuit.

Specifically, if a common inductor is provided on a path extending from a connection point between the inductor 6 and the capacitor 7 to the connection point between the capacitive load 2a and the capacitive load 2b, the load inductor 5a and the load inductor 5b can be replaced with one common inductor. As a result, downsizing and cost reduction can be achieved.

However, if the connection point between the capacitive load 2a and the capacitive load 2b is at a GND potential as shown in FIG. 4, this configuration causes fluctuation, at high voltage, of the potential of the connection point between the inductor 6 and the capacitor 7 and the potential of the AC power source 1.

Figure 5:
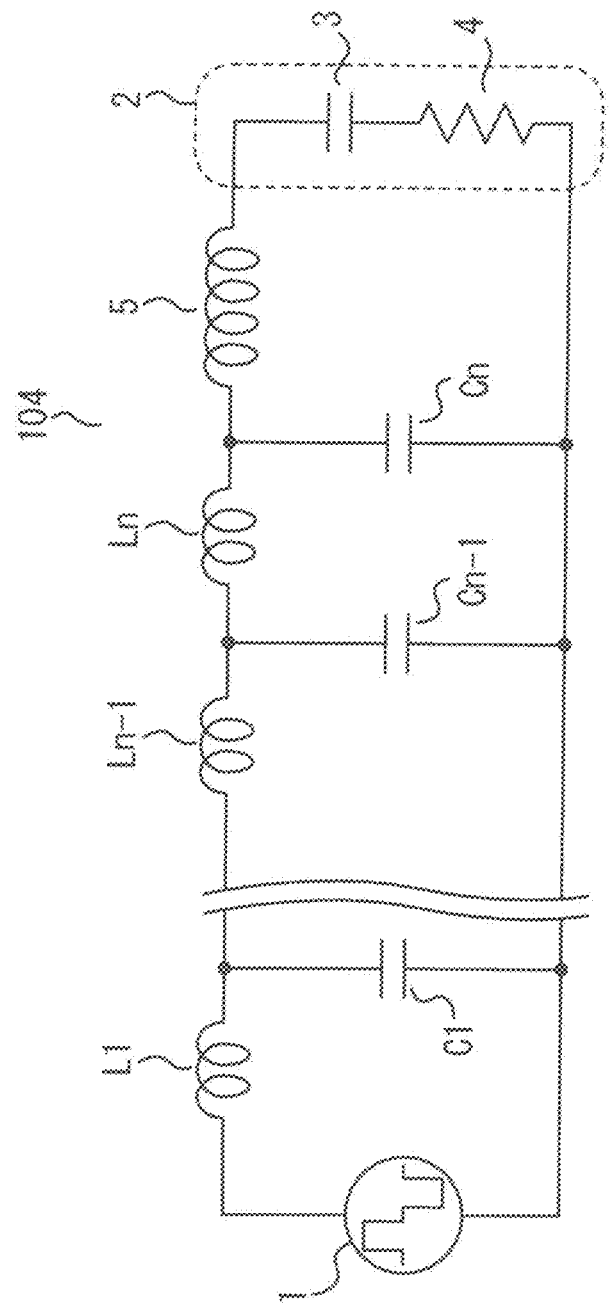
FIG. 5 is a configuration diagram of a power source device in which the capacitive load is driven by the AC voltage source and multiple stages of series resonance circuits, according to embodiment 1.

Next, a power source device in which multiple stages of resonance circuits composed of inductors and capacitors are used will be described with reference to FIG. 5. Here, the power source device in FIG. 5 is shown as a power source device 104 to be distinguished from the power source device 100 in FIG. 1.

Unlike in the power source device 100 in FIG. 1 in which two stages of LC resonance circuits are present, a configuration in which three or more stages of LC resonance circuits are present can also be employed.

The power source device 104 includes the AC power source 1; the capacitive load 2; the load inductor 5 which forms a resonance circuit together with the capacitive load 2; and furthermore, a first inductor L1 and a first capacitor C1, ..., an (n−1)-th inductor Ln−1 and an (n−1)-th capacitor Cn−1, and an n-th inductor In and an n-th capacitor Cn which are used for amplifying the quality factor of the resonance circuit, where "n" is an integer not smaller than 2.

Here, the first inductor L1 and the first capacitor C1 form a first resonance circuit, ..., the (n−1)-th inductor Ln−1 and the (n−1)-th capacitor Cn−1 form an (n−1)-th resonance circuit, and the n-th inductor In and the n-th capacitor Cn form an n-th resonance circuit.

It is noted that the first inductor is denoted by L1 and the first capacitor is denoted by C1 in order to form multiple stages and generalize descriptions.

If the resonance frequency of each stage of LC resonance circuit is adjusted so as to satisfy expression (1), the advantageous effect of further increasing the boost ratio in the power source device 100 described with reference to FIG. 1 can be obtained.

In FIG. 5, for example, a series circuit composed of a second inductor 12 and a second capacitor C2 is connected in parallel to the first capacitor C1 out of the first inductor L1 and the first capacitor C1 connected to form a series circuit. However, the same advantageous effect can be obtained also by connecting the series circuit composed of the second inductor L2 and the second capacitor C2 in parallel to the first inductor L1 as described with reference to FIG. 1 and FIG. 3.

As described above, the power source device according to embodiment 1 includes a capacitive load; and an AC power source, as a voltage source, which applies AC voltage to the capacitive load. The power source device has a configuration in which a series circuit composed of a first inductor and a first capacitor is connected to the AC power source; a series circuit composed of a load inductor and the capacitive load is connected in parallel to one of the first inductor or the first capacitor; a resonance frequency of the first inductor and the first capacitor and a resonance frequency of the load inductor and the capacitive load are matched with each other; and a frequency of the AC power source is matched with each of the resonance frequencies. Therefore, in the power source device according to embodiment 1, the quality factor of the resonance circuit can be freely designed, and the boost ratio can be increased so that high voltage for driving the capacitive load can be generated without using any transformer.

Embodiment 2

In a power source device according to embodiment 2, an inductive load is driven by the AC voltage source.

The power source device according to embodiment 2 will be described focusing on differences from that according to embodiment 1 with reference to FIG. 6 which is a configuration diagram of a power source device in which an inductive load is driven by the AC voltage source and the series resonance circuit.

Figure 6:
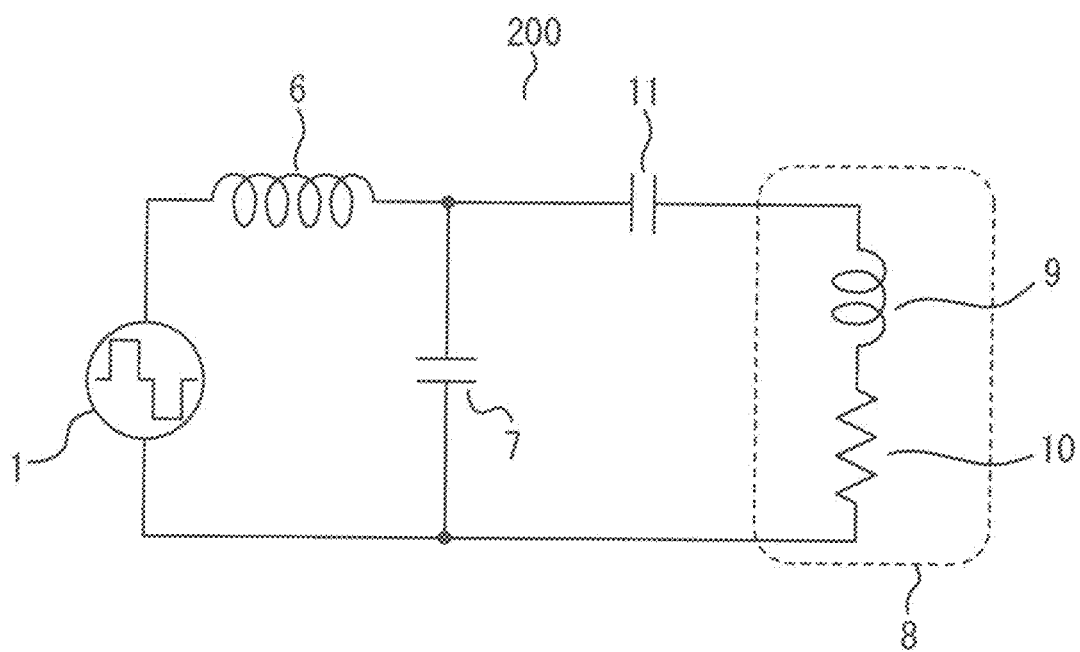
FIG. 6 is a configuration diagram of a power source device in which an inductive load is driven by the AC voltage source and the series resonance circuit, according to embodiment 2.

In FIG. 6 for embodiment 2, portions identical or corresponding to those in embodiment 1 are denoted by the same reference characters.

It is noted that the present power source device is shown as a power source device 200 to be distinguished from that according to embodiment 1.

In embodiment 1, drive of the capacitive load such as an ozonizer and a barrier discharge-utilizing lamp has been described.

In embodiment 2, capability to use the basic configuration of the power source device 100 according to embodiment 1 also for driving an inductive load will be described.

Here, the inductive load refers to a load including a strong inductive component as an electric property, and a representative example thereof is, for example, an induction heating (IH) coil for an IH cooking heater or the like.

The power source device 200 includes the AC power source 1 as an AC voltage source; an inductive load 8; a load capacitor 11 which forms a resonance circuit together with the inductive load 8; and furthermore, the inductor 6 and the capacitor 7 which are used for amplifying the quality factor of the resonance circuit.

The inductive load 8 is a load to be driven by the AC power source 1. An equivalent circuit of the inductive load 8 is expressed with an equivalent inductor 9 as an inductive component; and an equivalent resistor 10 as a resistance component.

In FIG. 6, the equivalent circuit of the inductive load 8 is expressed with series connection between the equivalent inductor 9 and the equivalent resistor 10. However, as described in embodiment 1, there are cases where, depending on the inductive load, it is more appropriate to express the equivalent circuit with parallel connection between the equivalent inductor and the equivalent resistor; or both an equivalent resistor that is in series to the equivalent inductor and an equivalent resistor that is in parallel to the equivalent inductor.

These cases slightly differ from one another in terms of circuits but do not significantly differ from one another in terms of the manner of handling. Thus, descriptions will be given while the inductive load 8 is expressed with series connection between the equivalent inductor 9 and the equivalent resistor 10 as in FIG. 6.

Here, an inductance of the equivalent inductor 9 is defined as Ls, and a capacitance of the load capacitor is defined as Cs.

As is known from FIG. 6, the AC power source 1 as a voltage source, the capacitor 7 (the capacitance thereof is defined as Cp), and the inductor 6 (the inductance thereof is defined as Lp) are the same as those in FIG. 1 for embodiment 1. A series circuit composed of the load capacitor 11 (the capacitance thereof is defined as Cs) and the inductive load 8 is connected in parallel to the capacitor 7.

As is obvious by expressing with the equivalent circuits, the circuit in FIG. 6 is completely identical to that in FIG. 1 for embodiment 1, and the same advantageous effect can be expected.

In the case where the frequency of the AC power source 1 is defined as fv, high voltage can be applied across the inductive load 8 if circuit constants (i.e., the equivalent inductance Is of the equivalent inductor 9, the capacitance Cs of the load capacitor 11, the inductance Lp of the inductor 6, and the capacitance Cp of the capacitor 7) are set so as to satisfy expression (1).

Specifically, high voltage can be applied across the inductive load 8 if the series circuit composed of the inductor 6 and the capacitor 7 is connected to the AC power source 1; a series circuit composed of the load capacitor 11 and the inductive load 8 is connected in parallel to one of the inductor 6 or the capacitor 7; the resonance frequency of the inductor 6 and the capacitor 7 and a resonance frequency of the load capacitor 11 and the inductive load 8 are matched with each other; and the frequency fv of the AC power source is matched with each of the resonance frequencies.

A configuration (not shown), such as one shown in FIG. 2 to FIG. 4 for embodiment 1, that conforms to the configuration in FIG. 6 can also be realized in the same manner.

That is, if the series resonance circuit composed of the capacitor 7 and the inductor 6 is added, a voltage higher than a voltage capable of being realized with ordinary series resonance of the inductive load 8 and the load capacitor 11 can be applied to the inductive load 8 by the AC voltage source.

Embodiment 3

In a power source device according to embodiment 3, the inductive load is driven by an AC current source.

The power source device according to embodiment 3 will be described focusing on differences from that according to embodiment 1 with reference to FIG. 7 to FIG. 9 which are each a configuration diagram of a power source device in which the inductive load is driven by an AC current source and a parallel resonance circuit; FIG. 10 which is a configuration diagram of a power source device in which two inductive loads are driven; and FIG. 11 which is a configuration diagram of a power source device in which the capacitive load is driven by the AC current source and the parallel resonance circuit, In FIG. 7 to FIG. 11 for embodiment 3, portions identical or corresponding to those in embodiment 1 are denoted by the same reference characters.

It is noted that the present power source device is shown as a power source device 300 to be distinguished from that according to embodiment 1.

In embodiment 2, an example has been described in which the AC power source as a voltage source is used for the purpose of applying, to the inductive load, a voltage higher than that in ordinary series resonance.

However, in general, an inductive load is an inductor, that is, a coil, and thus is frequently used for allowing high current to flow therethrough instead of allowing high voltage to be applied thereto. As a circuit that does not perform "boosting" for high voltage but "amplifies" high current, a parallel resonance circuit is more suitable than a series resonance circuit.

In parallel resonance, with an inductor and a capacitor being connected in parallel to an AC current source, even when current from the AC power source is very low, current of each of the inductor and the capacitor is significantly amplified by the resonance. Consequently, high current can be caused to flow through the inductor or the capacitor.

A basic configuration of the power source device 300 according to embodiment 3 will be described with reference to FIG. 7. In addition, modifications of the power source device 300 in FIG. 7 which is a basic configuration diagram thereof will be described with appropriate reference to FIG. 8 and FIG. 9.

The power source device 300 includes an AC power source 12 as an AC current source; the inductive load 8; the load capacitor 11 which forms a resonance circuit together with the inductive load 8; and furthermore, the inductor 6 and the capacitor 7 which are used for amplifying the quality factor of the resonance circuit.

Figure 7:
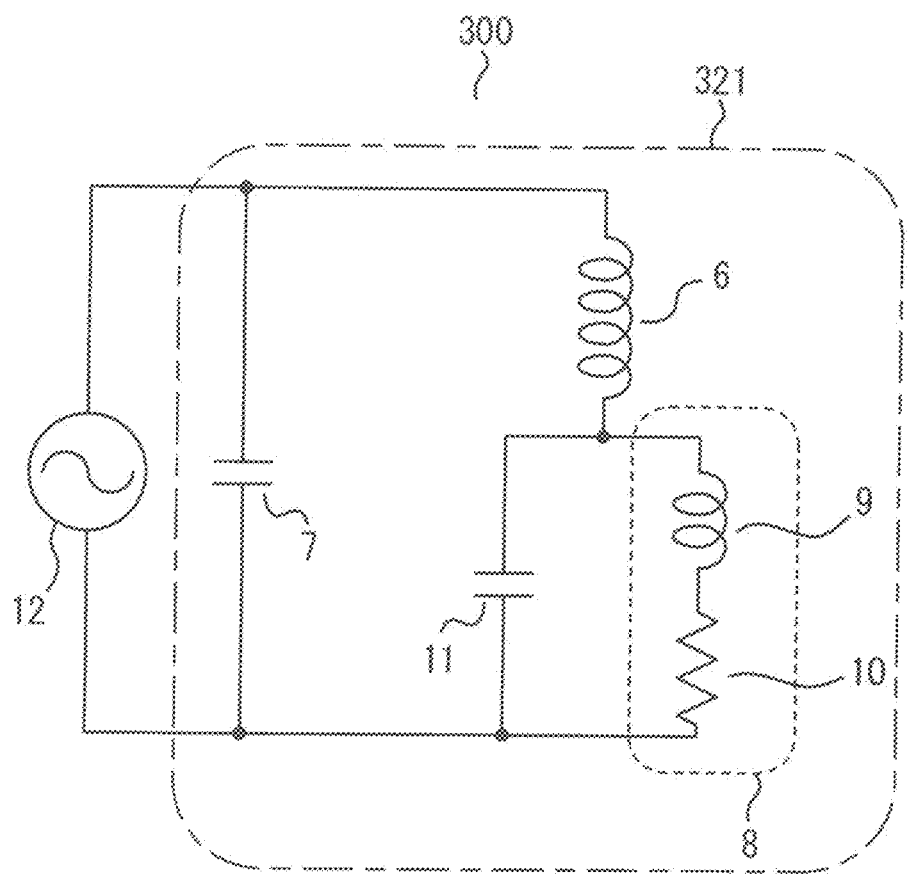
FIG. 7 is a configuration diagram of a power source device in which the inductive load is driven by an AC current source and a parallel resonance circuit, according to embodiment 3.

In FIG. 7, the inductive load 8 is expressed as a series circuit composed of the equivalent inductor 9 and the equivalent resistor 10. However, there is also a case where it is more appropriate to express the inductive load 8 as a parallel circuit composed of the equivalent inductor 9 and the equivalent resistor 10 as in FIG. 8.

Figure 8:
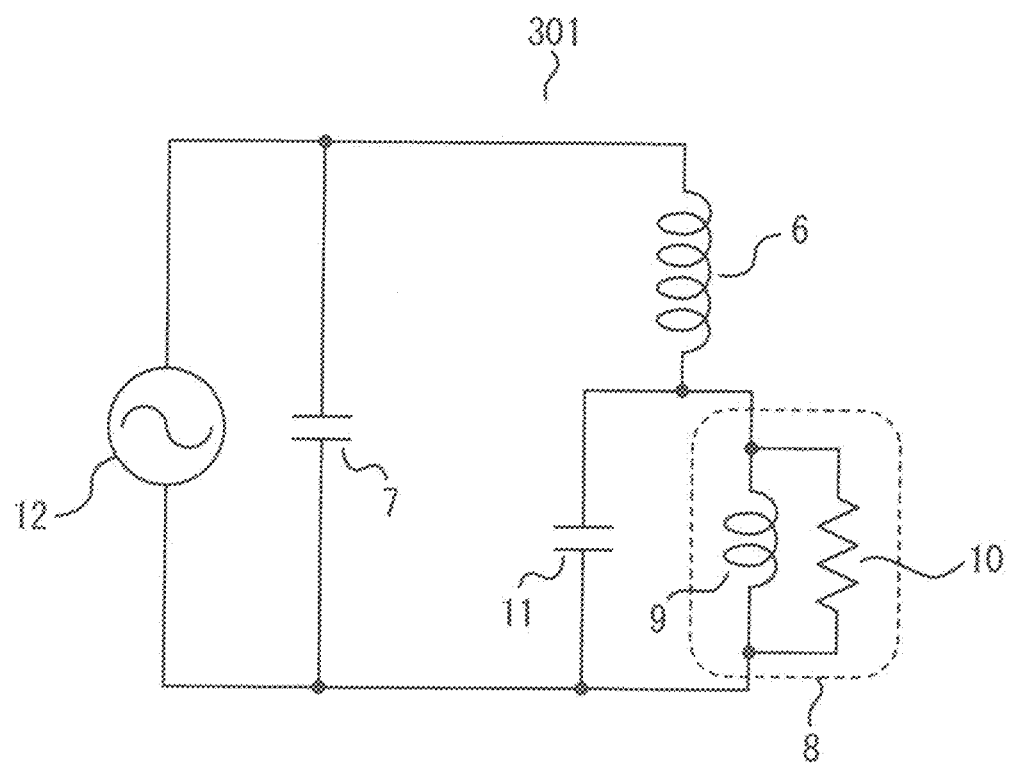
FIG. 8 is another configuration diagram of the power source device in which the inductive load is driven by the AC current source and the parallel resonance circuit, according to embodiment 3.

It is noted that the power source device in FIG. 8 is shown as a power source device 301 to be distinguished from the power source device 300 in FIG. 7.

Here, the inductance of the equivalent inductor 9 is defined as Ls, and a resistance value of the equivalent resistor 10 is defined as RL. The equivalent inductance Ls and the equivalent resistance value RL are determined according to a physical operation of the inductive load 8 and, in general, fluctuate over time. However, if the equivalent inductance Ls and the equivalent resistance value RL are treated as in circuits, the average values thereof can be used.

In the same manner as in embodiment 1, the equivalent inductance Ls or the equivalent resistance value RL defined here are such equivalent average values.

In the case where the inductive load 8 is driven with parallel resonance, a capacitor is provided in parallel thereto. The load capacitor 11 in FIG. 7 is the capacitor for parallel resonance. Here, the capacitance of the load capacitor 11 is defined as Cs.

In addition thereto, the capacitor 7 and the inductor 6 are connected in parallel to the AC power source 12 as in FIG. 7 in the present disclosure. Here, the capacitance of the capacitor 7 is Cp, and the inductance of the inductor 6 is Lp.

A circuit including the inductive load 8 and further including the capacitor 7 (capacitance Cp), the inductor 6 (inductance Lp), and the load capacitor 11 (capacitance Cs) which form the resonance circuits of the present disclosure, is described as a load circuit 321 in the sense of a load as seen from the AC power source 12, It is noted that FIG. 8 and the subsequent drawings for embodiment 3 do not show any circuit corresponding to the load circuit 321.

An operational characteristic of the load circuit 321 is that two stages of resonance circuits are present, Specifically, the capacitor 7 and the inductor 6 connected in parallel to the AC power source 12 form a first stage of resonance circuit. A parallel circuit composed of the inductive load 8 and the load capacitor 11, connected in series to the inductor 6 is formed as a second stage of resonance circuit.

If both the resonance frequencies of the first stage of resonance circuit and the second stage of resonance circuit are matched with the frequency fv of the AC power source 12 so as to satisfy expression (1), high current can be caused to flow through the inductive load 8 according to the same principle as that described in embodiment 1.

Specifically, current having been caused to flow by the AC power source 12 as an AC current source is first resonated by the first stage of resonance circuit composed of the inductor 6 and the capacitor 7 and is further resonated by the second stage of resonance circuit composed of the load capacitor 11 and the inductive load 8, whereby high current can be caused to flow through the inductive load 8.

This load circuit 321 is characterized in that the current amplification ratio thereof can be freely designed. Descriptions regarding this characteristic are the same as those in embodiment 1, and thus will be omitted.

Figure 9:
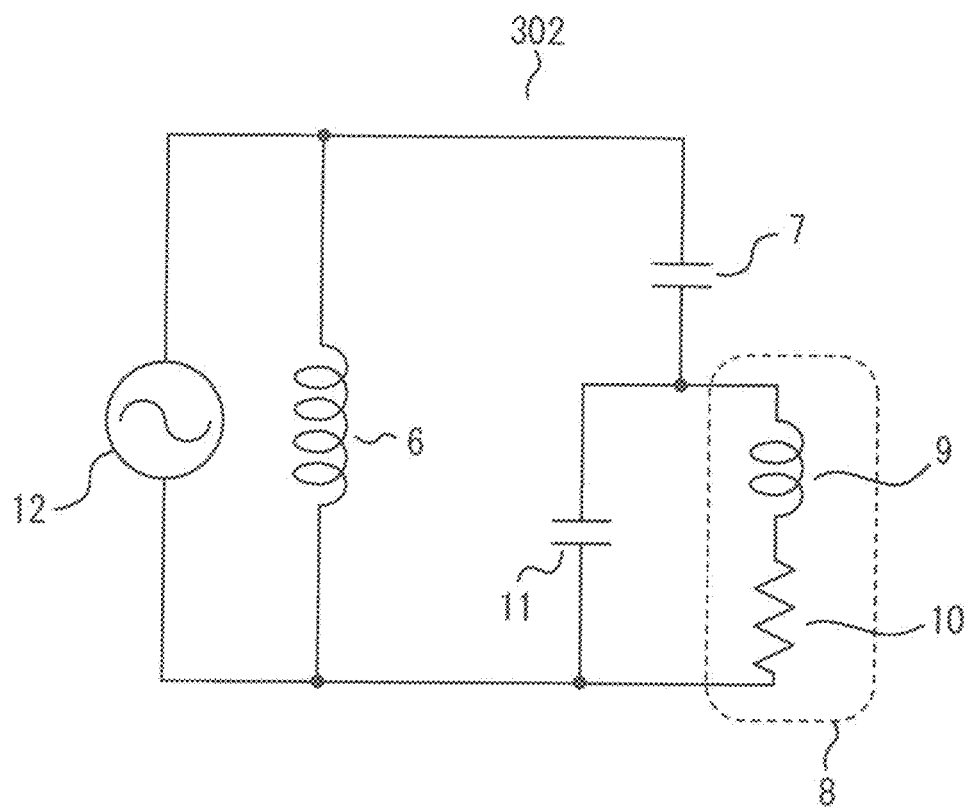
FIG. 9 is another configuration diagram of the power source device in which the inductive load is driven by the AC current source and the parallel resonance circuit, according to embodiment 3.
Figure 10:
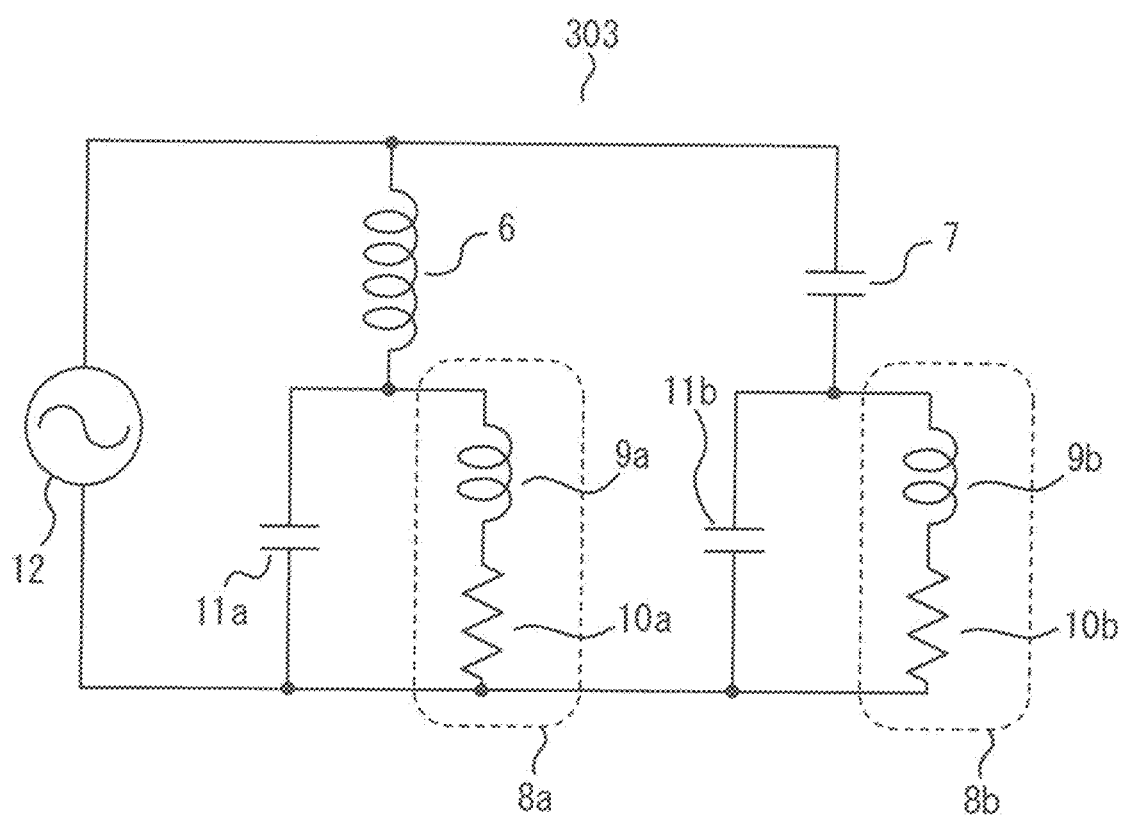
FIG. 10 is a configuration diagram of a power source device in which two inductive loads are driven by the AC current source and the parallel resonance circuit, according to embodiment 3.

In the circuit in FIG. 7, the inductor 6 and the capacitor 7 in the first stage play equivalent roles under the resonance condition, and thus may be exchanged to obtain a configuration such as one in FIG. 9.

It is noted that the power source device in FIG. 9 is shown as a power source device 302 to be distinguished from the power source device 300 in FIG. 7, The parallel circuit composed of the inductor 6 and the capacitor 7 is connected to the AC power source 12, the parallel circuit composed of the load capacitor 11 and the inductive load 8 is connected in series to one of the inductor 6 or the capacitor 7, the resonance frequency of the inductor 6 and the capacitor 7 and the resonance frequency of the load capacitor 11 and the inductive load 8 are matched with each other, and the frequency fv of the AC power source 12 is matched with each of the resonance frequencies. Consequently, the quality factor of the resonance circuit can be freely designed, and the current amplification ratio can be increased so that high current for driving the inductive load can be generated without using any transformer.

Next, a case where two inductive loads are simultaneously driven by the single AC power source will be described with reference to FIG. 10, Here, the power source device in FIG. 10 is shown as a power source device 303 to be distinguished from the power source device 300 in FIG. 7.

The power source device 303 includes the AC power source 12; two inductive loads 8a and 8b; load capacitors 11a and 11b which form resonance circuits together with the respective inductive loads 8a and 8b; and furthermore, the inductor 6 and the capacitor 7 which are used for amplifying the quality factors of the resonance circuits.

The inductive load 8a includes an equivalent inductor 9a and an equivalent resistor 10a. The inductive load 8b includes an equivalent inductor 9b and an equivalent resistor 10b.

Here, the inductive load 8b and the load capacitor 11 are a first inductive load and a second load capacitor in the claims.

In FIG. 10, there is a characteristic that the two inductive loads 8a and 8b can be simultaneously driven by the single AC power source 12. The inductive load 8a and the inductive load 8b may be identical to or different from each other.

However, the resonance condition, that is, expression (1), needs to be kept satisfied in each resonance circuit.

The capacitive load described in embodiment 1 can also be driven by using the parallel-resonance-type circuit. A configuration example of a power source device in which the capacitive load is driven by using the parallel resonance circuit is shown in FIG. 11.

Figure 11:
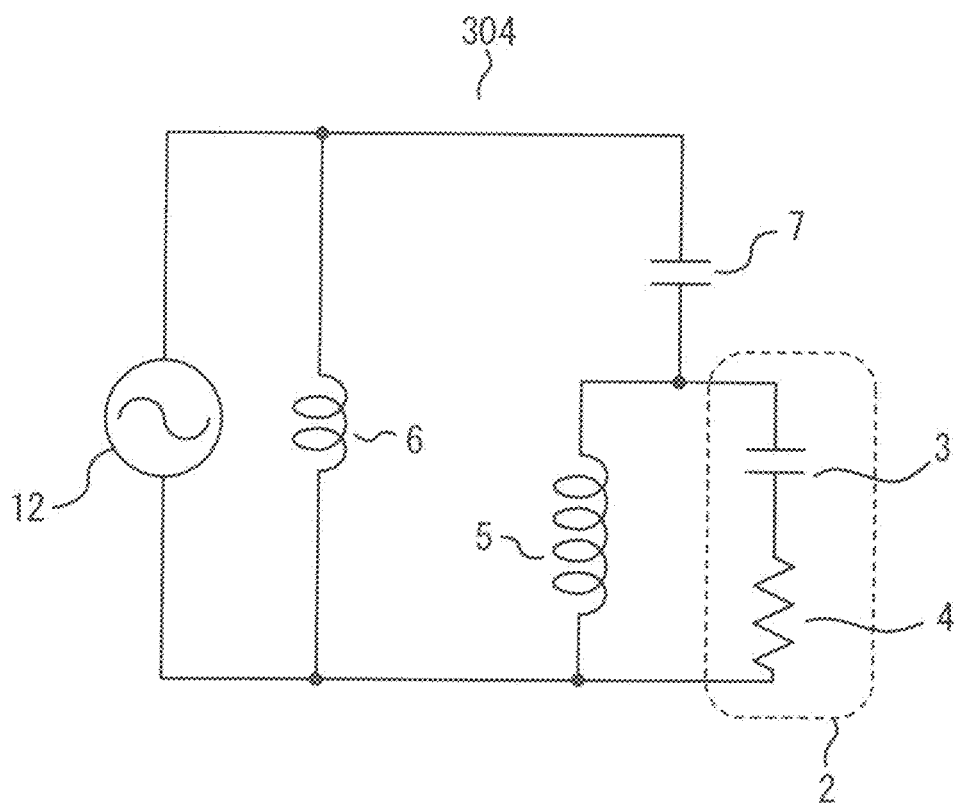
FIG. 11 is a configuration diagram of a power source device in which the capacitive load is driven by the AC current source and the parallel resonance circuit, according to embodiment 3.

Here, the power source device in FIG. 11 is shown as a power source device 304 to be distinguished from the power source device 300 in FIG. 7.

In the power source device 304, the inductor 6 and the capacitor 7 form a first stage of parallel resonance circuit, and the capacitive load 2 and the load inductor 5 form a second stage of parallel resonance circuit.

That is, in the power source device 304, the capacitive load 2 is driven by the AC power source 12 as an AC current source with use of the parallel resonance circuit composed of the inductor 6 and the capacitor 7.

That is, a configuration is employed in which the parallel circuit composed of the inductor 6 and the capacitor 7 is connected to the AC power source 12; a parallel circuit composed of the load inductor 5 and the capacitive load 2 is connected in series to one of the inductor 6 or the capacitor 7; the resonance frequency of the inductor 6 and the capacitor 7 and the resonance frequency of the load inductor 5 and the capacitive load 2 are matched with each other; and the frequency of the AC power source is matched with each of the resonance frequencies. Consequently, by using the AC current source, the quality factor of the resonance circuit can be freely designed, and the current amplification ratio can be increased so that high current for driving the capacitive load can be generated without using any transformer.

Alternatively, it is also possible to employ a configuration in which the two capacitive loads are simultaneously driven in the same manner as in the power source device 303 in FIG. 10, with the power source device 304 in FIG. 11 being a base.

As described above, in the power source device according to embodiment 3, the inductive load is driven by the AC current source, Therefore, in the power source device according to embodiment 3, by using the AC power source as a current source, the quality factor of the resonance circuit can be freely designed, and the current amplification ratio can be increased so that high current for driving the inductive load can be generated without using any transformer.

Embodiment 4

In embodiment 4, specific configuration examples of the AC voltage source described in embodiment 1 and the AC current source described in embodiment 3 will be described.

Figure 12:
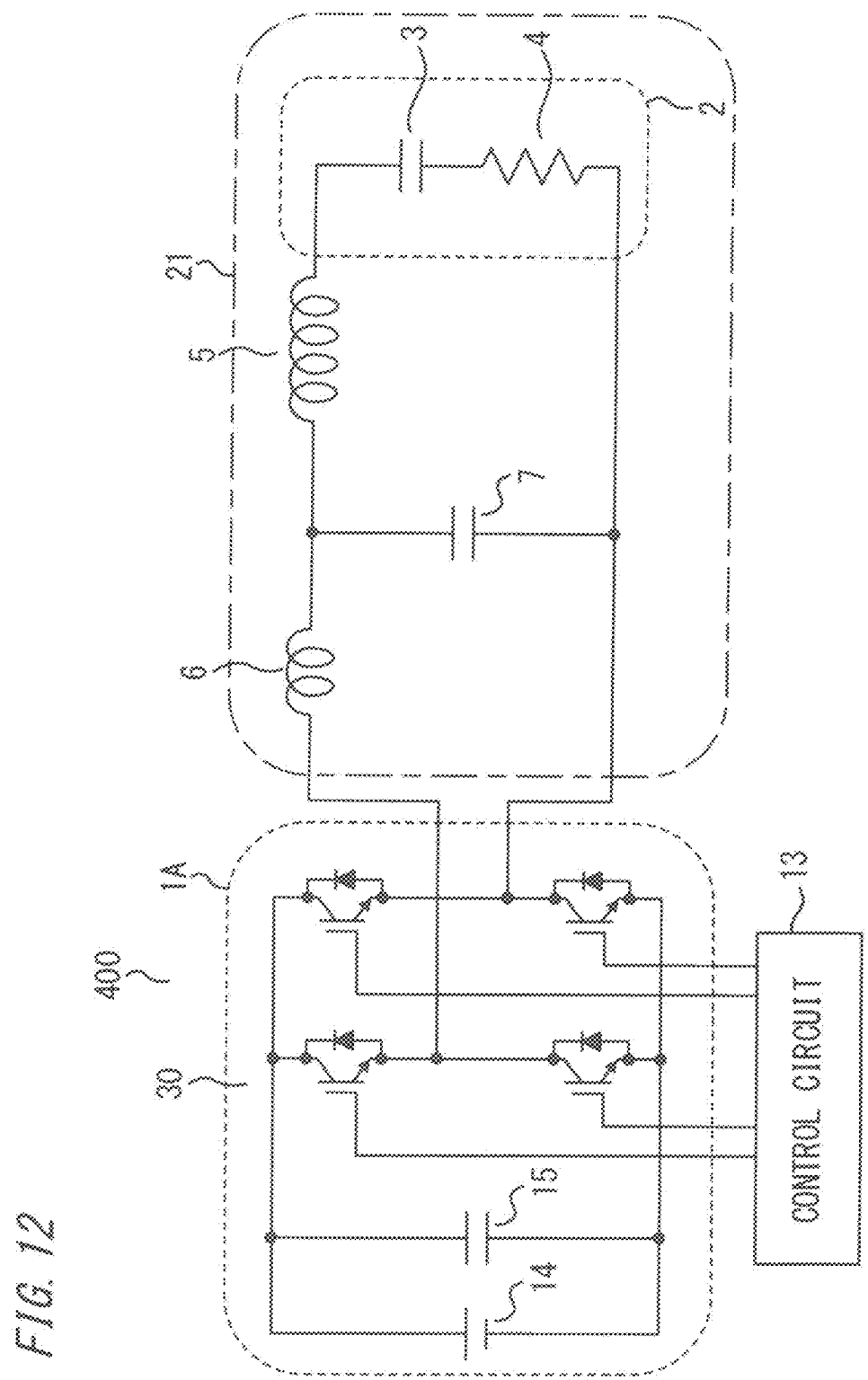
FIG. 12 is a configuration diagram of a power source device in which an AC voltage source is formed by using insulated gate bipolar transistors (IGBTs), according to embodiment 4.
Figure 13:
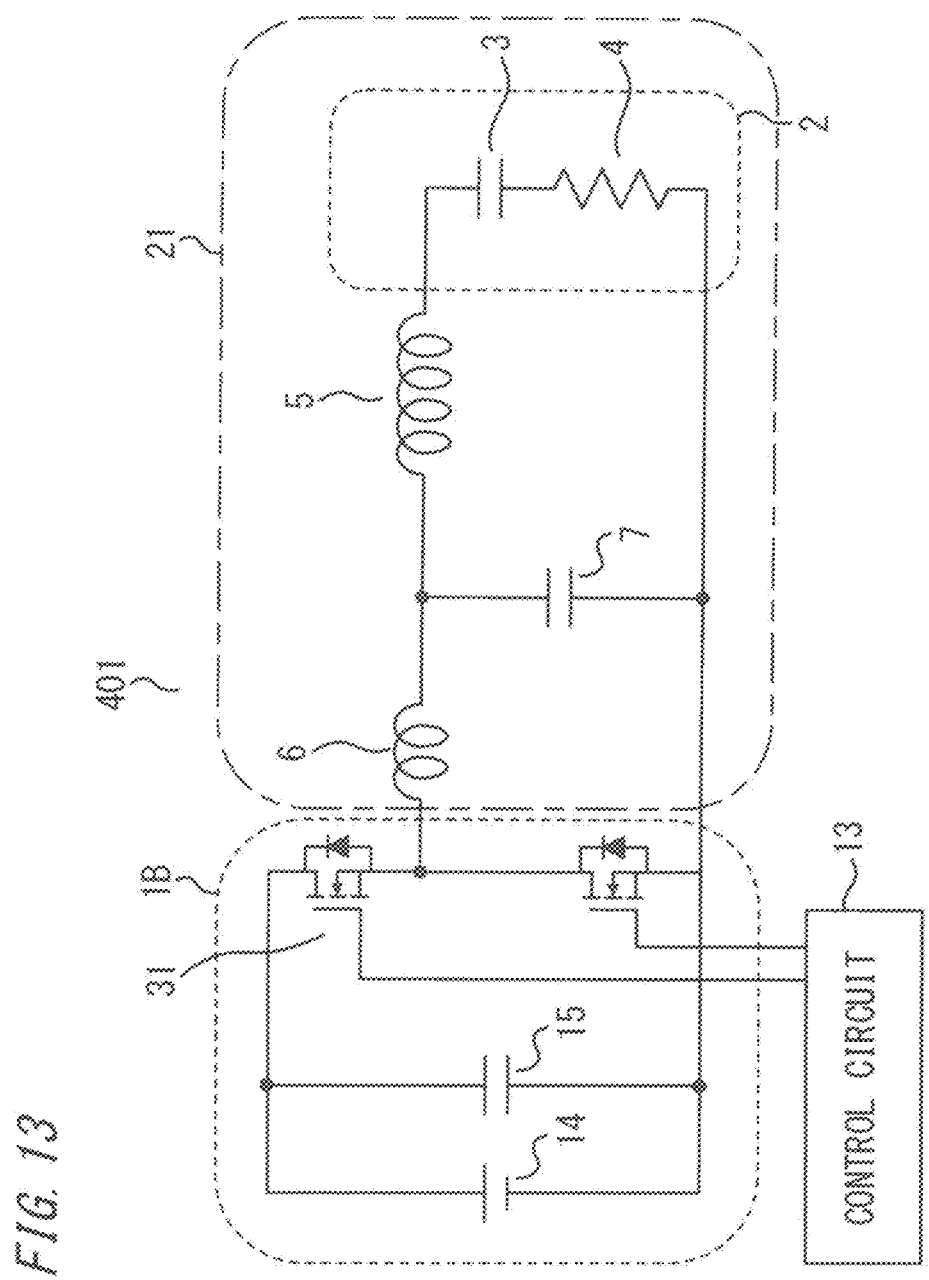
FIG. 13 is a configuration diagram of a power source device in which an AC voltage source is formed by using metal-oxide-semiconductor field-effect transistors (MOS-FETs), according to embodiment 4.
Figure 14:
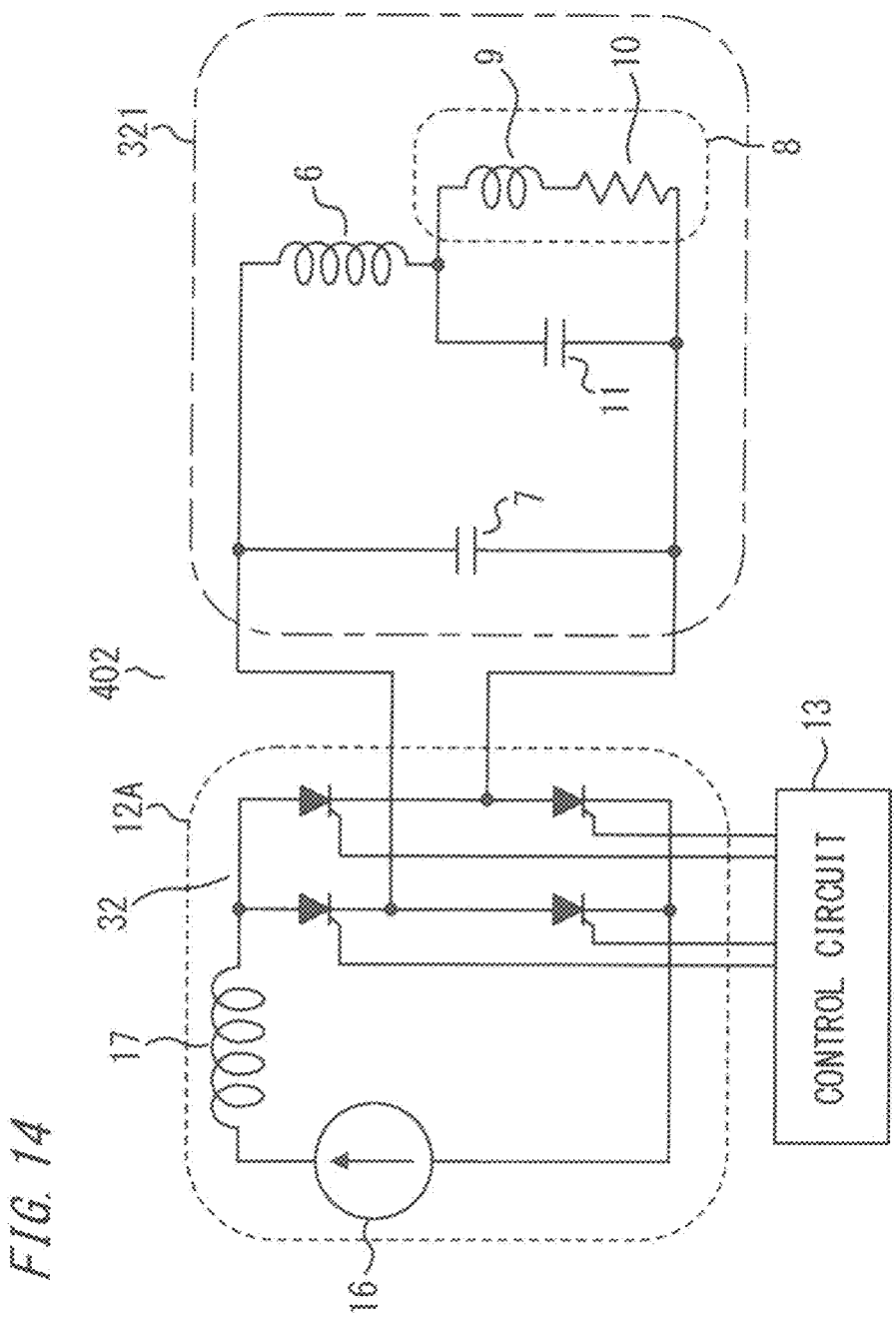
FIG. 14 is a configuration diagram of a power source device in which an AC current source is formed by using thyristors, according to embodiment 4.

A power source device according to embodiment 4 will be described with reference to FIG. 12 which is a configuration diagram of a power source device in which an AC voltage source is formed by using IGBTs; FIG. 13 which is a configuration diagram of a power source device in which an AC voltage source is formed by using MOSFETS; FIG. 14 which is a configuration diagram of a power source device in which an AC current source is formed by using thyristors; and FIG. 15 which is a configuration diagram of a power source device in which an AC current source is formed by using IGBTs.

In the configuration diagrams for embodiment 4, portions identical or corresponding to those in embodiments 1 and 3 are denoted by the same reference characters.

Firstly, the AC voltage source will be described.

A voltage source refers to a power source designed to control the voltage value of an output to a certain value, and is ideally a power source that, no matter how much the current increases, has a non-fluctuating output voltage, that is, has an internal impedance of zero.

Although a power source having an internal impedance of zero does not exist in actuality, power sources are designed in consideration of this characteristic. An AC voltage source refers to a voltage source in which the value of the voltage thereof is caused to fluctuate at a certain frequency.

A power source device 400 in which an AC voltage source is formed by using IGBTs will be described with reference to FIG. 12.

The power source device 400 includes an AC voltage source 1A; a control circuit 13 which controls an inverter unit of the AC voltage source 1A; and the load circuit 21.

The AC voltage source 1A includes a constant voltage source 14; a capacitor 15 for stabilizing the output voltage of the constant voltage source 14; and a full-bridge inverter 30 formed by four IGBTs as elements.

Here, the AC voltage source LA corresponds to the AC power source 1 in FIG. 1 for embodiment 1.

The control circuit 13 controls switching of each of the IGBTs so as to obtain an AC waveform having a predetermined frequency. The IGBT is a voltage-type element, and a voltage waveform determined according to the constant voltage source 14 and the switching waveform is outputted from the full-bridge inverter 30. That is, the AC voltage source 1A functions as a voltage-type inverter.

The load circuit 21 includes the capacitive load 2 composed of the equivalent capacitor 3 and the equivalent resistor 4; the load inductor 5; the capacitor 7; and the inductor 6. The load circuit 21 has already been described in embodiment 1, and thus will not be described here.

Next, a power source device 401 in which an AC voltage source is formed by using MOSFETs will be described with reference to FIG. 13. It is noted that the power source device in FIG. 13 is shown as the power source device 401 to be distinguished from the power source device 400 in FIG. 12.

The power source device 401 includes an AC voltage source 18; the control circuit 13 which controls an inverter unit of the AC voltage source 1B; and the load circuit 21.

The AC voltage source 18 includes the constant voltage source 14; the capacitor 15 for stabilizing the output voltage of the constant voltage source 14; and a half-bridge inverter 31 formed by two MOSFETs as elements.

Here, the AC voltage source 18 corresponds to the AC power source 1 in FIG. 1 for embodiment 1.

The control circuit 13 controls switching of each of the MOSFETs so as to obtain an AC waveform having a predetermined frequency. The MOSFET is a voltage-type element, and a voltage waveform determined according to the constant voltage source 14 and the switching waveform is outputted from the half-bridge inverter 31. That is, the AC voltage source 18 functions as a voltage-type inverter.

Next, the AC current source will be described.

A current source refers to a power source designed to control the current value of an output to a certain value, and is ideally a power source that, no matter how high the output voltage becomes, can be kept having a fixed current value, that is, has an internal admittance of zero (infinite impedance).

Although a power source having an infinite impedance does not exist in actuality, power sources are designed in consideration of this characteristic. An AC current source refers to a current source in which the valve of the current thereof is caused to fluctuate at a certain frequency.

A power source device 402 in which an AC current source is formed by using thyristors will be described with reference to FIG. 14. It is noted that the power source device in FIG. 14 is shown as the power source device 402 to be distinguished from the power source device 400 in FIG. 12.

The power source device 402 includes an AC current source 12A; the control circuit 13 which controls an inverter unit of the AC current source 12A; and the load circuit 321.

The AC current source 12A includes a constant current source 16; an inductor 17 for stabilizing the output current of the constant current source 16; and a full-bridge inverter 32 formed by four thyristors as elements.

Here, the AC current source 12A corresponds to the AC power source 12 in FIG. 7 for embodiment 3.

The control circuit 13 controls switching of each of the thyristors so as to obtain an AC waveform having a predetermined frequency. The thyristor is a current-type element, and a current waveform determined according to the constant current source 16 and the switching waveform is outputted from the full-bridge inverter 32 by causing current to be ON/OFF. That is, the AC current source 12A functions as a current-type inverter.)

The load circuit 321 includes the inductive load 8 composed of the equivalent inductor 9 and the equivalent resistor 10; the load capacitor 11; the capacitor 7; and the inductor 6. The load circuit 321 has already been described in embodiment 3, and thus will not be described here.

The current-type inverter is ordinarily formed by thyristors as current switching elements. The current-type inverter can be formed by using, instead of ordinary thyristors, any of gate turn-off thyristors (GTOs), gate commutated turn-off thyristors (GCTs), static induction (SI) thyristors, and MOS gate thyristors, Recently, voltage-type switching elements such as IGBTs and MOSFETs are generally used, and thus, as inverters as well, voltage-type ones are often used. However, in the case of using a parallel-type resonance circuit, a current-type power source is suitable, and, in the case of using voltage-type switching elements, the voltage-type switching elements are used with a voltage-type inverter being caused to have a characteristic similar to that of a current-type inverter.

Figure 15:
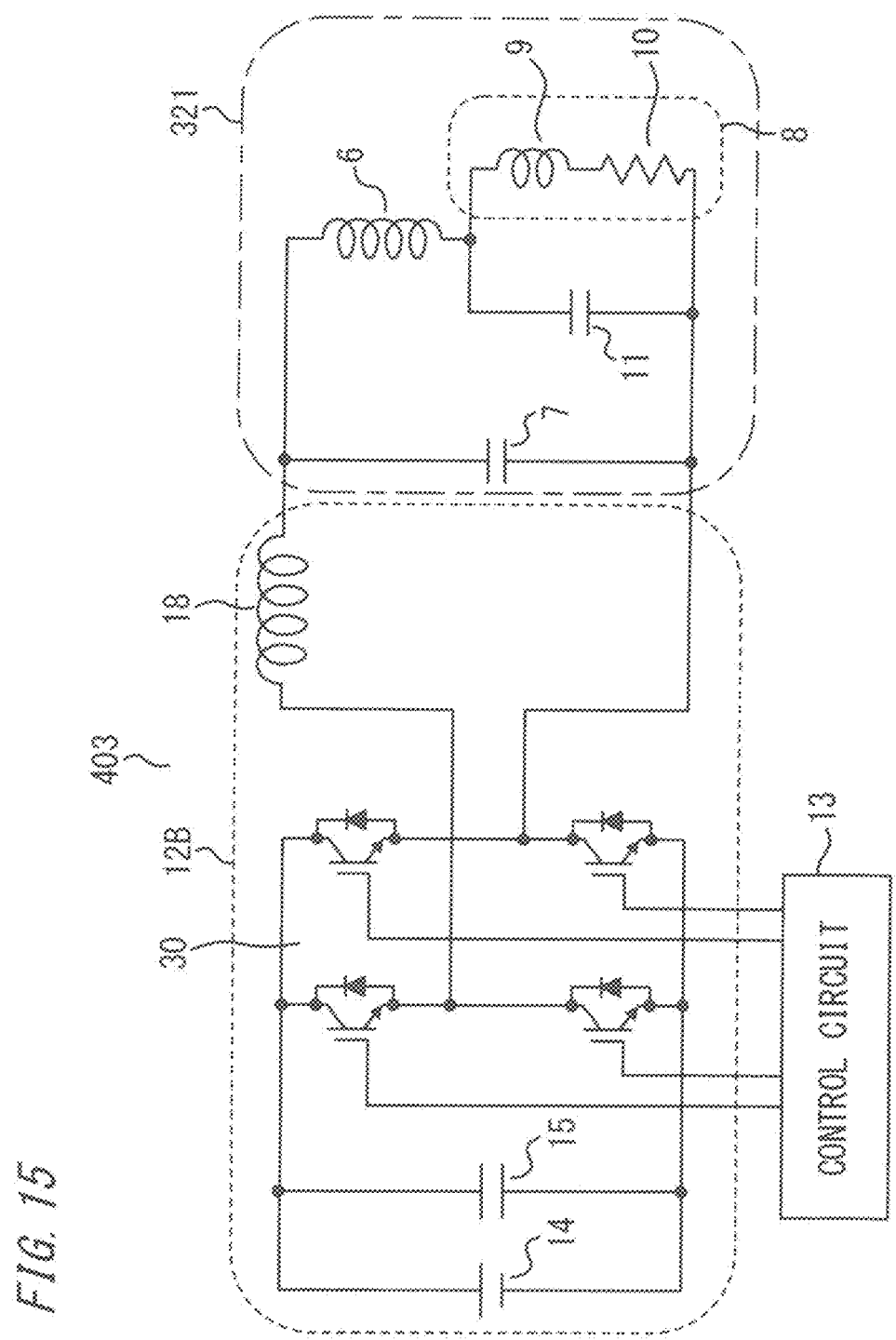
FIG. 15 is a configuration diagram of a power source device in which an AC current source is formed by using IGBTs, according to embodiment 4.

A configuration example in this case is shown in FIG. 15. It is noted that the power source device in FIG. 15 is shown as a power source device 403 to be distinguished from the power source device 400 in FIG. 12.

The power source device 403 includes an AC current source 128; the control circuit 13 which controls an inverter unit of the AC current source 128; and the load circuit 321.

The AC current source 128 includes the constant voltage source 14; the capacitor 15 for stabilizing the output voltage of the constant voltage source 14; the full-bridge inverter 30 formed by four IGBTs as elements; and furthermore, an inductor 18 for stabilizing the output current of the full-bridge inverter 30.

Here, the inductor 18 has a high inductance value. If this inductor 18 is provided, the output current of the full-bridge inverter 30 is stabilized, and a power source impedance as seen from a secondary side of the inductor 18 becomes high. Consequently, the inverter circuit including the inductor 18 as well comes to have a characteristic similar to that of an AC current source.

It is noted that the control circuit 13 and the load circuit 321 are respectively the same as those described regarding the power source device 400 and the power source device 402, and thus will not be described here.

An actual power source is not an ideal voltage source or an ideal current source, and the internal impedance thereof has a value that is not zero and that is not infinite but finite. The power source is merely designed to be used as a voltage source or a current source, or has a characteristic similar to that of the voltage source and the current source.

In the present disclosure, the "AC voltage source" means a power source that is designed to be used as a voltage source and that has a characteristic comparatively similar to that of the voltage source. Likewise, the "AC current source" means a power source that is designed to be used as a current source and that has a characteristic comparatively similar to that of the current source.

Although only the inverters in which the switching elements are used have been taken as examples in the above descriptions, there are other methods for obtaining AC voltage. For example, a bipolar power source formed by a linear amplifier can be used. In a case where the frequency does not need to be made variable, a commercial frequency can be directly used, or a harmonic can also be used.

Embodiment 5

A power source device according to embodiment 5 is provided with a mechanism that adjusts the inductance of an inductor composing a resonance circuit or the capacitance of a capacitor composing the resonance circuit.

The power source device according to embodiment 5 will be described focusing on differences from embodiment 1 with reference to FIG. 16 which is a configuration diagram of a power source device provided with an inductance adjustment circuit; and FIG. 17 which is a configuration diagram of a power source device provided with a capacitance adjustment circuit.

In the configuration diagrams for embodiment 5, parts identical or corresponding to those in embodiment 1 are denoted by the same reference characters.

As described in embodiment 1, the quality factor of the resonance circuit can be freely designed by using the configuration of the power source device according to the present disclosure. That is, the quality factor can be set to a very high value.

However, if the quality factor is high, the width of the frequency for resonance is narrowed. That is, production of a circuit having a high quality factor makes it difficult to achieve resonance circuit matching.

A resonance circuit is composed of a reactor and a capacitor, and, in general, characteristics of these circuit constituents change according to temperature and over time. That is, an inductance value and a capacitance thereof change.

In addition, in general, electric properties of a capacitive load or an inductive load change when operation conditions change.

As is generally known, an average capacitance of a barrier discharge load as a capacitive load changes according to power. Such change in the inductance or the capacitance in a circuit inflicts influence on resonance characteristics of the circuit. In a case where the quality factor is very high and the frequency range in which resonance is possible is very narrow, an off-resonance state might be taken so that the circuit stops operating.

Therefore, in the case of applying the power source device according to the present disclosure, any adjustment mechanism for maintaining resonance of the circuit is desirably present.

In the case of realizing the adjustment mechanism for maintaining resonance of the circuit, there are two problems in terms of means for adjusting resonance; and a control method as to the basis and the manner of the adjustment. They will be sequentially described.

Firstly, the means for adjusting resonance will be described.

The most easily applicable means for adjusting resonance is adjustment based on frequency.

In the power source device according to the present disclosure, a case where an inverter is used as an AC power source has been mainly described in embodiment 4. By using the control circuit 13 which controls each inverter described regarding the power source device 400 to the power source device 403 in FIG. 12 to FIG. 15 for embodiment 4, the frequency of the inverter is easily made variable.

Therefore, the inverter used for the power source device according to the present disclosure is desirably provided with a mechanism capable of controlling the frequency.

Meanwhile, a case where the frequency cannot be made variable is also conceivable.

For example, this case corresponds to a case where operation needs to be performed at a specific frequency; a case where a frequency command value is given from outside; or a case where matching with another device needs to be made.

Alternatively, this case corresponds to a case where AC of a frequency-fixed AC power source instead of an inverter, that is, AC of a grid, is directly used; or a case where oscillation is desired to be caused at 13.56 MHz or a frequency obtained by multiplication thereof in consideration of restrictions stipulated in the Radio Act.

In such a case, it is necessary to fix the frequency and adjust a circuit constant to achieve resonance matching. To this end, a mechanism capable of adjusting the inductance of the inductor or the capacitance of the capacitor is provided.

Figure 16:
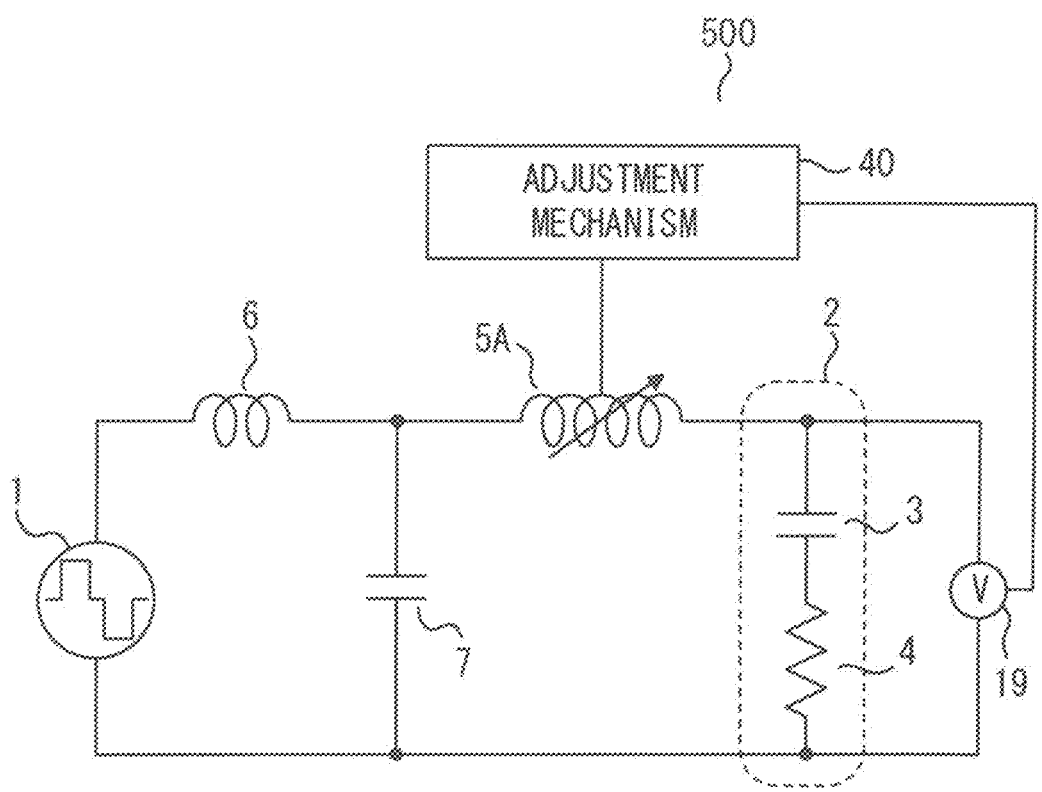
FIG. 16 is a configuration diagram of a power source device provided with an inductance adjustment circuit, according to embodiment 5.

FIG. 16 shows a specific configuration example of a power source device in which the adjustment mechanism is used.

A power source device 500 includes the AC power source 1 as a voltage source; the capacitive load 2 composed of the equivalent capacitor 3 and the equivalent resistor 4; a variable load inductor 5A which forms a resonance circuit together with the capacitive load 2; and the capacitor 7 and the inductor 6 which are used for amplifying the quality factor of the resonance circuit.

The power source device 500 further includes a voltage detector 19 which detects a voltage applied to the capacitive load 2; and an adjustment mechanism 40 which adjusts the inductance of the variable load inductor 5A.

In the case of adjusting the inductance of an inductor (coil), the inductance ordinarily needs to be mechanically adjusted. The adjustment mechanism 40 described here includes such a mechanical adjustment mechanism.

Further, it is also possible to, for example, provide the voltage detector 19 which detects a voltage of the circuit, and feed back the detected voltage value to the adjustment mechanism 40. In this case, the adjustment mechanism 40 adjusts the inductance value of the variable load inductor 5A such that the detected voltage is maximized.

The power source device 500 in FIG. 16 is configured to perform feedback adjustment on the inductance value of the variable load inductor 5A according to the voltage value from the voltage detector 19 by using the adjustment mechanism 40.

Although, in the power source device 500 in FIG. 16, the adjustment mechanism is provided with respect to the load inductor 5 of the power source device 100 in FIG. 1 for embodiment 1, an adjustment mechanism can also be provided with respect to the load capacitor 11 of the power source device 300 in FIG. 7 for embodiment 3.

Figure 17:
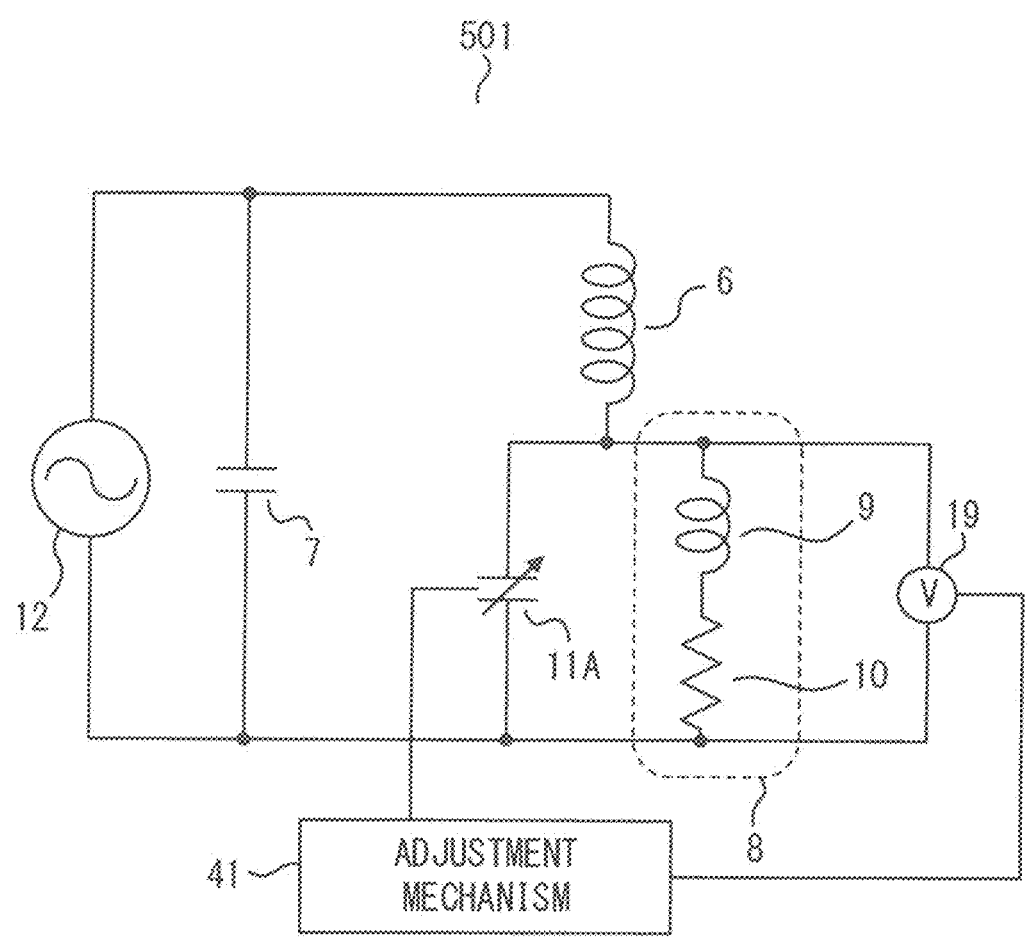
FIG. 17 is a configuration diagram of a power source device provided with a capacitor adjustment circuit, according to embodiment 5.

FIG. 17 shows a configuration example in which an adjustment mechanism is provided with respect to the load capacitor 11 of the power source device 300 in FIG. 7 for embodiment 3. It is noted that the power source device in FIG. 17 is shown as a power source device 501 to be distinguished from the power source device 500 in FIG. 16.

The power source device 501 in FIG. 17 performs feedback adjustment on the capacitance value of a variable load capacitor 11A according to the voltage value from the voltage detector 19 by using an adjustment mechanism 41.

Further, an adjustment mechanism can also be provided with respect to the inductor 6 or the capacitor 7 which form the first stage of resonance circuit in the power source device 100 or the power source device 300.

Specifically, for example, it is effective to provide, to the power source device 100 in FIG. 1 for embodiment 1, an adjustment mechanism which makes variable at least one inductance or capacitance among the inductance of the inductor 6, the capacitance of the capacitor 7, and the inductance of the load inductor 5.

In addition, for example, it is effective to provide, to the power source device 300 in FIG. 7 for embodiment 3, an adjustment mechanism which makes variable at least one inductance or capacitance among the inductance of the inductor 6, the capacitance of the capacitor 7, and the capacitance of the load capacitor 11.

Further, each of the adjustment mechanisms described above in embodiment 5 can be provided to the power source device 200 in FIG. 6 for embodiment 2 and the power source device 304 in FIG. 11 for embodiment 3.

Further, a case where, even if the frequency of the AC power source can be made variable, the range of possible variation is restricted is also conceivable.

For example, in barrier discharge of an ozonizer or the like, the appropriate frequency range is limited since supplied power is proportional to frequency. Moreover, the fluctuation width of the circuit constant of each circuit element or the change width, of the average capacitance of the capacitive load or the like, based on an operation condition is large, and might be unable to be adjusted within a range of frequency capable of being made variable by the power source device. One of solutions in this case is to provide a mechanism for adjusting the circuit constant of the circuit element.

In this case, slight adjustment of a frequency within a narrow frequency range can be performed by an inverter, and thus the value of the inductance or the capacitance does not need to be continuously changed and only has to be adjusted in several stages, Specifically, it is also possible to provide a plurality of inductors or capacitors in parallel and perform switching therebetween by a relay, to adjust the value of the inductance or the capacitance.

Embodiment 6

In embodiment 6, quantitative contemplation is conducted regarding allowable fluctuation ranges for each circuit constant in a resonance circuit as a part of the power source device; and the frequency of the AC power source as a part of the power source device.

In order for the power source device according to the present disclosure to sufficiently exhibit the performance thereof, expression (1) needs to be satisfied. However, when, for example, the average capacitance Cs of the Capacitive load has changed, both of the two equalities in expression (1) cannot be satisfied by merely changing the frequency. Provision of two mechanisms which each change an inductance or a capacitance makes it possible to simultaneously satisfy the two equalities in expression (1). However, this provision makes it difficult, in terms of mechanism, to physically change the circuit constant.

Therefore, in designing of the power source device according to the present disclosure, even if designing is made so as to satisfy expression (1) under a rated condition, it is necessary to first ascertain what the fluctuation range of the capacitance or the inductance of the load is. In addition, in a case where the capacitance or the inductance of the load fluctuates, in particular, in a case where the circuit constant changes according to an operation condition such as power of the load, it is necessary to ascertain how the circuit constant changes upon a change in the operation condition, a transient response, start-up, or the like. Further, it is necessary to ascertain the extent to which this change in the circuit constant influences resonance; and whether any problem arises in terms of circuit operation.

In this case, it is conceivable to control the frequency of the inverter so as to successfully perform resonance matching. A key to the power source device according to the present disclosure is to form a circuit that satisfies expression (1), and it is necessary to take a countermeasure on the assumption that, if the inductance and the capacitance of the circuit have simultaneously changed, the condition in expression (1) becomes unsatisfied and it becomes unable to perfectly achieve resonance matching.

That is, important issues are how to change the frequency and how to design an operation allowable range and a control method.

Next, for the power source device according to the present disclosure, quantitative contemplation is conducted as to the extent of deviation, from the equalities in expression (1), that may occur.

When the voltage of the load is boosted to Vp at a resonance angular frequency ω0 (resonance point), an angular frequency at which the voltage of the load becomes Vp/2 as a result of changing the angular frequency from ω0 to a slightly lower side is defined as ω1. In contrast, an angular frequency at which the voltage of the load becomes Vp/2 as a result of changing the angular frequency to a slightly higher side is defined as ω2.

In this case, the quality factor is expressed with expression (4). In addition, expression (5) is derived from expression (4).

$$Q = \omega 0/(\omega 2 - \omega 1) \qquad (4)$$

$$\omega 2 - \omega 1 = \omega 0/Q \qquad (5)$$

Here, if the target value of the quality factor in the power source device according to the present disclosure is set to be equal to or larger than 5 and desirably equal to or larger than 10, a frequency width at which the voltage becomes half is 20% of a resonance frequency in the case of Q=5 and is equal to or lower than 10% of the resonance frequency in the case of Q=10.

This fact is considered as follows with reference back to expression (1). That is, if Q=5 is assumed to be satisfied, when the frequency fluctuates by a width of 20%, that is, ±10%, with respect to the resonance frequency, the right-hand side of expression (1) fluctuates by +20%. Likewise, if Q=10 is assumed to be satisfied, when the frequency fluctuates by a width of 10%, that is, 5%, with respect to the resonance frequency, the right-hand side of expression (1) fluctuates by ±10%.

This fact applies not only to the frequency but also to the circuit constant,

That is, in the case of Q=5, when, for example, the circuit constant fluctuates and, as a result, Lp×Cp fluctuates by 20%, this means that drive with the frequency fv being kept at a pre-fluctuation value causes a boost voltage to be half.

This way of thinking forms the basis of a fluctuation range regarding expression (1). That is, in the case of Q=5, designing should be performed on the assumption that each term in expression (1) fluctuates by about ±20%.

If the quality factor increases, the (allowable) width of this fluctuation decreases. For example, in the case of Q=10, this width is about ±10%.

If the above contemplation results are expressed with expressions, allowable fluctuation ranges of the respective circuit constants in the case of Q=5 are as indicated by expression (6) and expression (7).

$$0.8/((2\pi \cdot fv)^2) < Lp \cdot Cp < 1.2/((2\pi \cdot fv)^2) \qquad (6)$$

$$0.8/((2\pi \cdot fv)^2) < Ls \cdot Cs < 1.2/((2\pi \cdot fv)^2) \qquad (7)$$

Allowable fluctuation ranges of the respective circuit constants in the case of Q=10 are as indicated by expression (8) and expression (9).

$$0.9/((2\pi \cdot fv)^2) < Lp \cdot Cp < 1.1/((2\pi \cdot fv)^2) \qquad (8)$$

$$0.9/((2\pi \cdot fv)^2) < Ls \cdot Cs < 1.1/((2\pi \cdot fv)^2) \qquad (9)$$

Therefore, since the target value of the quality factor in the power source device according to the present disclosure is equal to or larger than 5 as described above, it is effective to employ a configuration in which expression (6) and expression (7) are basically satisfied for the power source device 100 in FIG. 1 for embodiment 1, for example.

In addition, it is effective to employ a configuration in which expression (6) and expression (7) are basically satisfied for the power source device 200 in FIG. 6 for embodiment 2.

In addition, it is effective to employ a configuration in which expression (6) and expression (7) are basically satisfied for the power source device 300 and the power source device 304 respectively in FIG. 7 and FIG. 11 for embodiment 3.

Embodiment 7

Embodiment 7 relates to a power source device configured such that one or both of a voltage and a current of a resonance circuit are detected and fed back to a control circuit of an inverter, and a resonance state is maintained; and a power source device configured such that a voltage and a current of the AC power source are detected and the phase difference between the voltage and the current is minimized so that a resonance state is maintained.

The power source device according to embodiment 7 will be described focusing on differences from embodiment 1 with reference to FIG. 18 which is a configuration diagram of a power source device that performs control based on a voltage of the capacitive load; FIG. 19 which is a configuration diagram of a power source device that performs control based on a current of the capacitive load; FIG. 20 which is a configuration diagram of a power source device that performs control based on a current of the AC power source; and FIG. 21 which is a configuration diagram of a power source device that performs control based on a voltage and a current of the AC power source.

In the configuration diagram for embodiment 7, parts identical or corresponding to those in embodiment 1 are denoted by the same reference characters.

In embodiment 7, control methods will be described as to how to confirm that resonance of the resonance circuit is attained; and how to perform control, Specific configuration examples of power source devices to which the control methods have been applied, will be described.

Each control method is applied to the power source device 100 in FIG. 1 for embodiment 1 as a base, but is applicable to the other power source devices in the same manner.

Firstly, a configuration example of a power source device that performs control based on a voltage of the capacitive load will be described with reference to FIG. 18. The power source device and the control circuit in FIG. 18 are shown as a power source device 701 and a control circuit 13A to be distinguished from those in FIG. 1 for embodiment 1.

The power source device 701 includes the AC power source 1 as a voltage source; the capacitive load 2 composed of the equivalent capacitor 3 and the equivalent resistor 4; the load inductor 5 which forms a resonance circuit together with the capacitive load 2; and the capacitor 7 and the inductor 6 which are used for amplifying the quality factor of the resonance circuit.

The power source device 701 further includes the voltage detector 19 which detects a voltage applied to the capacitive load 2; and the control circuit 13A which controls the inverter unit of the AC power source 1 as an AC voltage source according to the voltage detected by the voltage detector 19.

It is noted that the capacitive load 2, the load inductor 5, the capacitor 7, and the inductor 6 in the power source device 701 according to embodiment 7 are the same as those in the power source device 100 according to embodiment 1, and thus only the control circuit 13A and the voltage detector 19 which have been added will be described.

A voltage across the voltage detector 19 which detects a voltage applied to the capacitive load 2, that is, a voltage across the capacitive load 2, is detected by the voltage detector 19 and fed back to the control circuit 13, and the inverter unit of the AC power source 1 as an AC voltage source is controlled.

Specifically, since the voltage across the capacitive load 2 is AC voltage, for example, the amplitude of the voltage detected by the voltage detector 19 is detected and fed back to the control circuit 13, and the frequency of the inverter is controlled such that the amplitude value of the detected voltage is maximized.

This is the most direct detection-and-control method for a power source device intended for boosting voltage by means of a series resonance circuit.

Next, a configuration example of a power source device that performs control based on a current of the capacitive load will be described with reference to FIG. 19. The power source device and the control circuit in FIG. 19 are shown as a power source device 702 and a control circuit 13B to be distinguished from those in FIG. 18.

Figure 18:
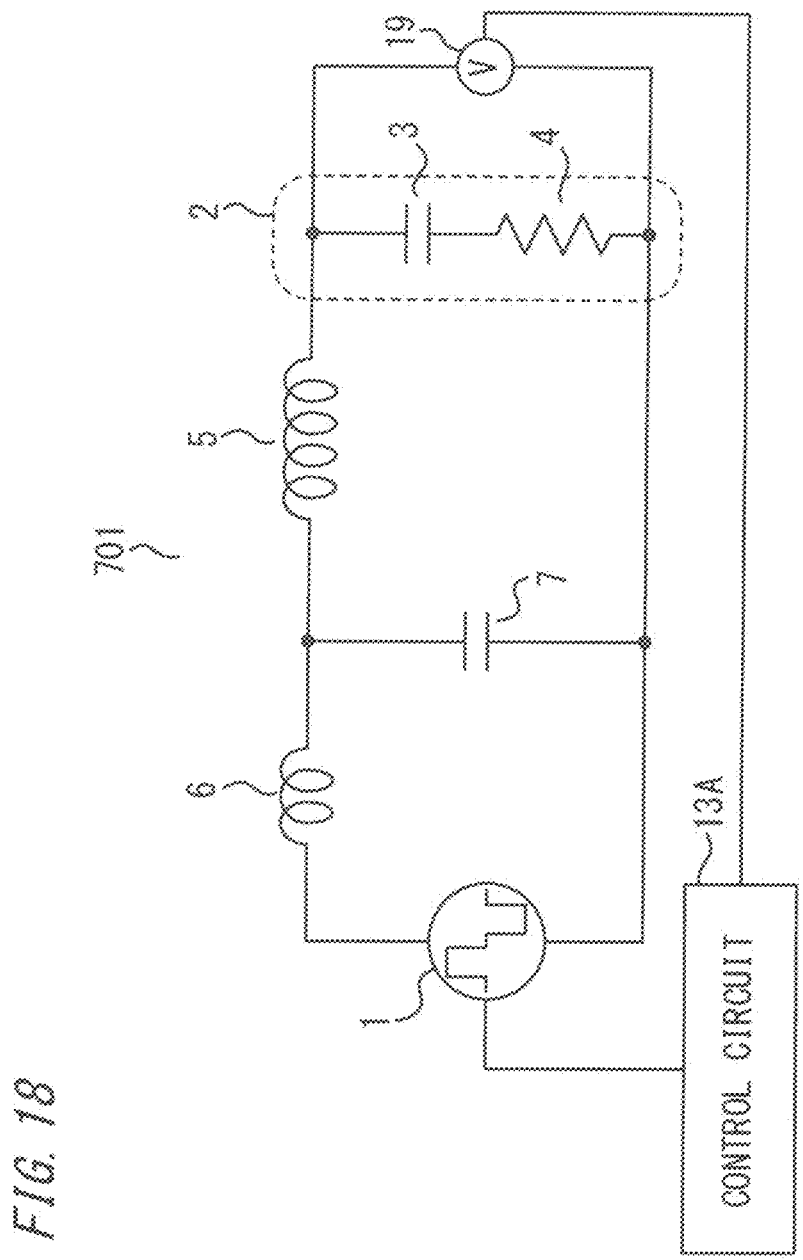
FIG. 18 is a configuration diagram of a power source device that performs control based on a voltage of the capacitive load, according to embodiment 7.
Figure 19:
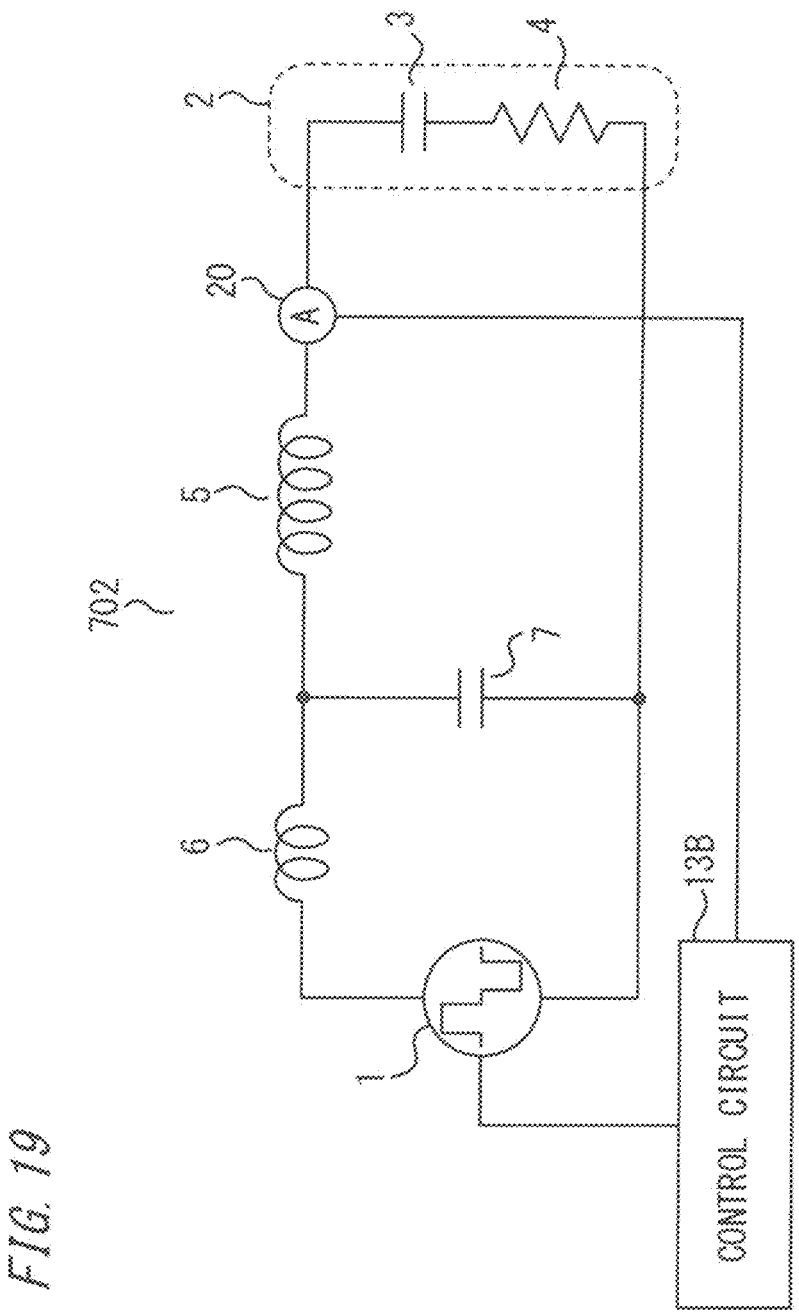
FIG. 19 is a configuration diagram of a power source device that performs control based on a current of the capacitive load, according to embodiment 7.
Figure 20:
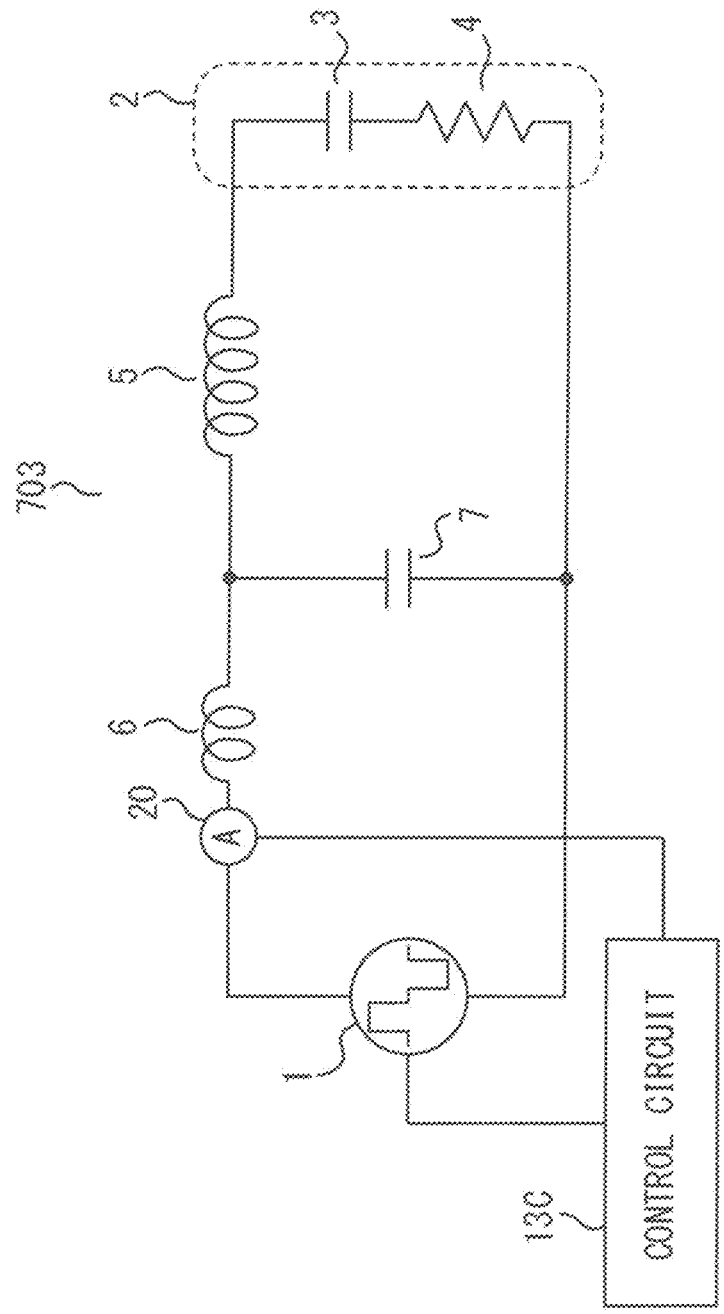
FIG. 20 is a configuration diagram of a power source device that performs control based on a current of the AC power source, according to embodiment 7.

A difference between the power source device 702 in FIG. 19 and the power source device 701 in FIG. 18 is that a current flowing through the capacitive load 2 is detected by a current detector 20 instead of detecting a voltage across the capacitive load 2 by the voltage detector 19. Only this difference will be described.

In general, when voltage increases, current also increases. Thus, if a current flowing through the capacitive load 2 is detected by the current detector 20 and fed back to the control circuit 13B such that the detected current is maximized, the resonance point can be indirectly searched for.

FIG. 19 shows an example in which current detection is applied to a voltage-resonance-type circuit.

Although not shown, a method for detecting a current of the inductive load 8 of a current-resonance-type circuit such as one in the power source device 300 in FIG. 7 for embodiment 3 is, similarly to a method for detecting a voltage in FIG. 18, a direct detection method for detecting a current that is intended to be controlled and that is desired to be amplified. If the detected current is fed back to the control circuit and control is performed such that the detected current is maximized, the resonance point can be directly searched for.

Alternatively, in the power source device 300 in FIG. 7 for embodiment 3, a voltage of the inductive load 8 is detected, the detected voltage is fed back to the control circuit, and control is performed such that the detected voltage is maximized. Consequently, the resonance point can be indirectly searched for.

It is also conceivable to detect a voltage of the capacitor 7 instead of detecting a voltage across the capacitive load 2 in the power source device 701 in FIG. 18. However, the method in this case involves detection of a resonance state in the first stage and is an indirect detection method.

Regarding detection of a voltage or a current, a method involving reference to the amplitude or the effective value thereof is the easiest and clearest detection method, and another method involving reference to a waveform harmonic is also conceivable.

This is because, as the state of a resonance circuit becomes more approximate to a resonance state, the voltage/current waveform of the resonance circuit becomes more similar to the waveform of a sine wave, and the proportion of a harmonic becomes lower. If a harmonic having the voltage/current waveform of the resonance circuit is monitored and control is performed so as to make the voltage/current waveform as similar to that of a sine wave as possible such that the harmonic is set to be as small as possible, approximation to the resonance point can be achieved.

Next, a configuration example of a power source device that performs control based on a current of the AC power source will be described with reference to FIG. 20. In FIG. 20, the power source device and the control circuit are shown as a power source device 703 and a control circuit 13C to be distinguished from those in FIG. 18.

A difference between the power source device 703 in FIG. 20 and the power source device 702 in FIG. 19 is that a current flowing through the inductor 6 is detected instead of detecting a current flowing through the capacitive load 2 by the current detector 20.

Although a current flowing through the inductor 6 is detected in FIG. 20, this should rather be regarded as a situation in which a current of the inverter of the AC power source 1 is detected. In this case, attention needs to be paid to the fact that, if supplied power to the capacitive load 2 is the same, a lower detected current in FIG. 20 leads to further approximation to the resonance point.

In the case of detecting a current of the inverter of the AC power source 1, control is desirably performed such that the power factor of the load, as seen from inverter output, including the resonance circuit as well, is set to be as approximate to 1 as possible. That is, an output voltage and an output current of the AC power source 1 are detected, and control is performed such that the phases of the output voltage and the output current are set to be as equal to each other as possible, that is, such that the phase difference between the output voltage and the output current is minimized. Consequently, approximation to the resonance point can be achieved.

Figure 21:
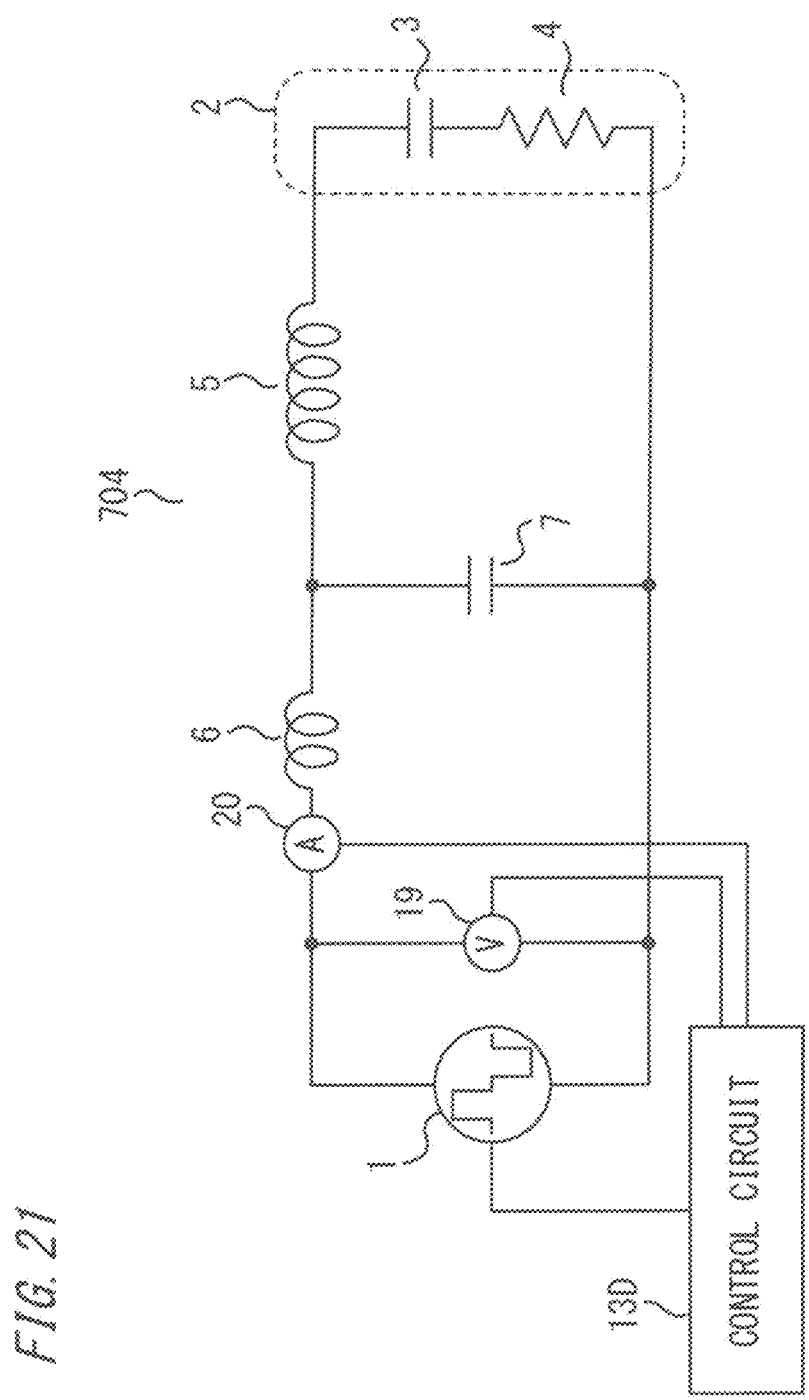
FIG. 21 is a configuration diagram of a power source device that performs control based on a voltage and a current of the AC power source, according to embodiment 7.

A specific configuration example in this case is shown in FIG. 21. The power source device and the control circuit in FIG. 21 are shown as a power source device 704 and a control circuit 13D to be distinguished from those in FIG. 18.

In the power source device 704 in FIG. 21, an output voltage and an output current of the AC power source 1 are detected, and the control circuit 13D performs control on the basis of the output voltage and the output current such that the phase difference between the output voltage and the output current is minimized.

In this case, a voltage-type inverter is formed, and the control circuit 13D ascertains an inverter output waveform. Therefore, control is desirably performed such that the phase of a current waveform of the inverter is set to be as identical to the phase of a voltage waveform thereof as possible, that is, the phase difference therebetween is set to be as approximate to zero as possible; the phase of the current waveform is delayed behind the phase of the voltage waveform as described later; or so-called zero voltage switching is performed in which inverter switching is performed at a moment at which the current becomes zero.

The phases of the voltage waveform and the current waveform of the inverter becoming equal to each other means that the power factor is maximized. That is, this indicates that operation is performed at the resonance point.

This control method is applicable also to a current-type inverter, that is, the power source device 300 in FIG. 7 for embodiment 3.

That is, if control is performed such that the phase difference between the output voltage and the output current of the AC power source 12 as an AC current source is minimized, approximation to the resonance point can be achieved (not shown).

Descriptions have been given above regarding a method in which the state of the resonance circuit is detected by using the voltage detector or the current detector; and control is performed such that the state of the resonance circuit becomes approximate to a resonance state. Although examples in each of which only one voltage detector or only one current detector is used have been described above, it is also possible to use both the voltage detector and the current detector, or a plurality of voltages or currents may be detected by using a plurality of voltage detectors or current detectors.

In addition, although a method for detecting an optimum drive condition on the basis of the phase difference between the voltage and the current of the inverter has been described, since the phase difference between the current and the voltage sensitively reflects a resonance state, it is also useful to detect a voltage and a current, and detect the phase difference between the voltage waveform and the current waveform to use the phase difference for control.

In addition, the method in which the resonance state of the resonance circuit is maintained as described above in embodiment 7 is applicable also to the power source device 200 in FIG. 6 for embodiment 2 and the power source device 304 according to embodiment 3.

Embodiment 8

Embodiment 8 relates to a power source device in which an optimum operation state is obtained through feedforward control on the basis of a prestored optimal operation condition.

The power source device according to embodiment 8 will be described focusing on differences from embodiment 1 with reference to FIG. 22 which is a configuration diagram of a power source device that performs control on the basis of a prestored optimal operation condition.

In the configuration diagram for embodiment 8, parts identical or corresponding to those in embodiment 1 are denoted by the same reference characters.

Control involving a so-called closed loop in which a current and a voltage are detected and fed back to a control system has been described in embodiment 7. Meanwhile, it is also conceivable to perform control involving an open loop, that is, feedforward control. For example, in a case where change in the state of the load with respect to operation condition is known in advance, an optimum frequency is obtained in advance according to the operation condition.

For example, in an ozonizer, an optimum frequency is determined according to supplied power as described in Patent Document 1. In such a case, with a table regarding a drive frequency with respect to set power being prestored in a memory, drive only has to be performed at a frequency that is based on a power command value given from outside.

Figure 22:
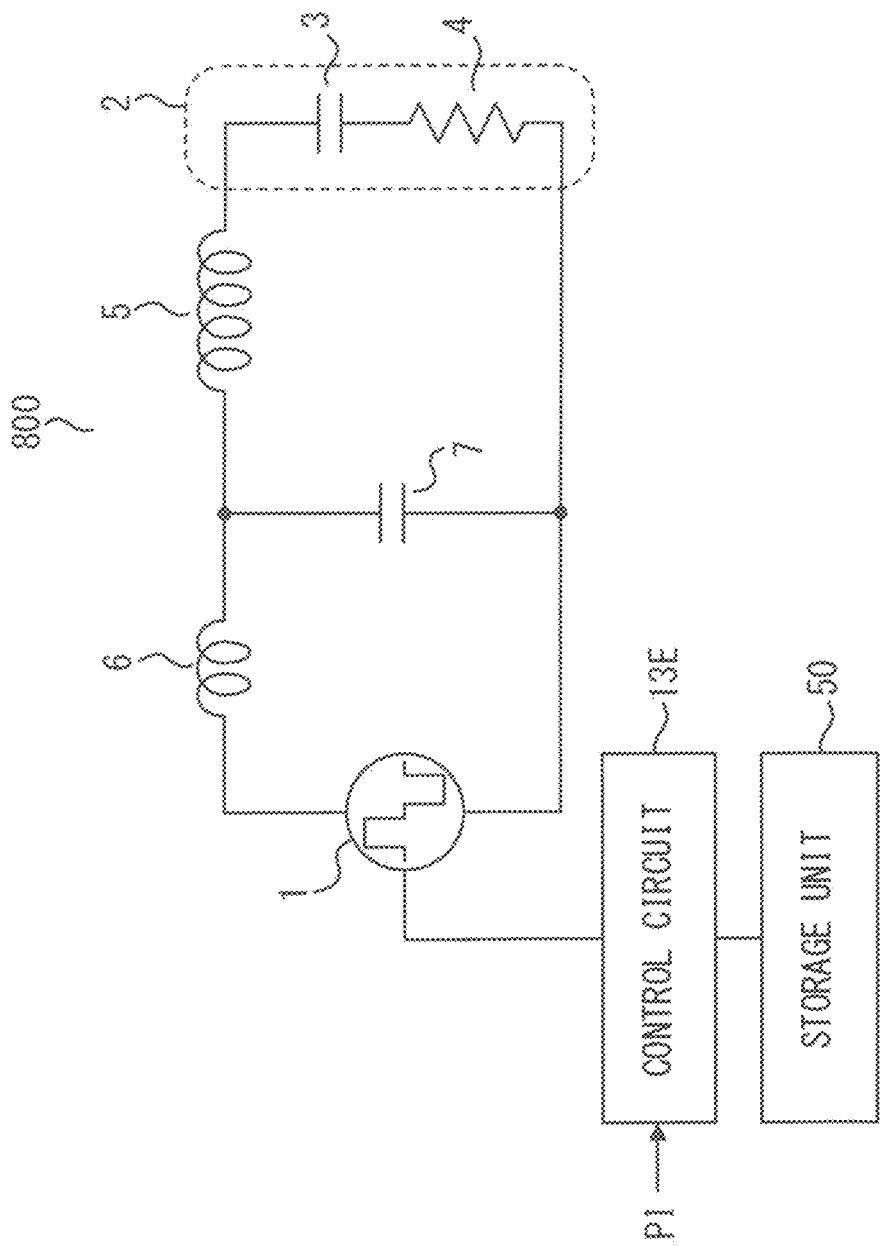
FIG. 22 is a configuration diagram of a power source device that performs control on the basis of a prestored optimal operation condition, according to embodiment 8.

FIG. 22 shows a specific configuration example of a power source device in which this feedforward control is employed.

A power source device 800 includes the AC power source 1 as a voltage source; a control circuit 13E which controls the inverter unit of the AC power source 1; the capacitive load 2 composed of the equivalent capacitor 3 and the equivalent resistor 4; the load inductor 5 which forms a resonance circuit together with the capacitive load 2; and the capacitor 7 and the inductor 6 which are used for amplifying the quality factor of the resonance circuit.

The power source device 800 further includes a storage unit 50 storing therein a table regarding an optimum frequency with respect to a power command value. In FIG. 22, PI is a power command.

The control circuit 13B receives the power command (PI) from outside and sets the frequency to an optimum frequency on the basis of a command value of the power command with reference to the table stored in the storage unit 50, to control the inverter of the AC power source 1. It is noted that the storage unit 50 may be provided inside the control circuit 13E.

The configuration of the power source device 800 in FIG. 22 has an advantage that neither a voltage nor a current needs to be detected so that control is easily performed at high speed. In particular, in cases where power significantly fluctuates upon start-up or the like, that is, in the case of occurrence of discontinuous changes in Characteristics such as a change from a state where discharge lighting has not occurred to a state where discharge lighting has occurred, control might become unstable with a feedback system, and thus feedforward control is effective. Moreover, feedforward control is particularly effective in a case where, as in the power source device according to the present disclosure, the quality factor of the resonance circuit is high, the operation frequency range is narrow, and control might become unstable with a feedback system.

It is also effective to make use of the advantages of both feedforward control and feedback control as follows. That is, upon start-up of the power source device 800 and in the case of performing initial setting for power, feedforward control is performed on the basis of the table regarding an optimum frequency with respect to a power command value, whereas, when operation starts to be stabilized, a voltage and a current of the resonance circuit are detected to perform feedback control in order to accurately maintain this stabilized state.

An example in which the control circuit 13E and the storage unit 50 are added to, and feedforward control is applied to, the power source device 100 in FIG. 1 for embodiment 1, has been described above.

The same advantageous effects can be obtained also if the control circuit and the storage unit are added to, and feedforward control is applied to, the power source device 300 in FIG. 7 for embodiment 3 (not shown).

In addition, the method described above in embodiment 8 is applicable to the power source device 200 in FIG. 6 for embodiment 2 and the power source device 304 in FIG. 11 for embodiment 3 in the same manner.

Embodiment 9

In embodiment 9, a resonance stabilization condition for a resonance circuit as a part of a power source device will be described.

In embodiment 5 to embodiment 8, descriptions have been given regarding a method in which the circuit constants in the resonance circuit and the frequency of the AC power source are changed; a method in which a voltage and a current of the resonance circuit are detected and fed back; and a method in which feedforward control is performed on the basis of a prestored optimal operation condition.

The above control methods are each intended for performing control so as to maintain an optimum condition for resonance.

Here, an optimum condition for resonance of the resonance circuit will be described.

Regarding an ozonizer as a capacitive load, operation of the ozonizer becomes more stable if a load circuit including a resonance circuit as seen from an inverter is experiencing phase delay than if the load circuit is exactly at the resonance point. This fact is described also in Patent Document 1.

The phase delay refers to a state where the phase of a current is delayed behind the phase of a voltage. In the case of a simple LC series circuit, this state is not a state where impedances of an inductor (L) and a capacitor (C) completely cancel each other out, but is a state where the inductance component is slightly greater, that is, a state where operation is being performed at a frequency that is slightly higher than the resonance frequency.

This can be explained from the aspect of stability of electric discharge with respect to a barrier discharge load such as an ozonizer. However, more generally, in the case of performing drive with a voltage-type inverter, operation of an inverter becomes more stable with a slight phase delay.

So-called zero voltage switching (ZVS) involving inverter switching at a moment at which a current waveform that has come to be substantially of a sine wave for resonance intersects zero, is considered to result in least loss. Further, an operation in which the frequency is set to be high as compared to a ZVS condition so as to perform adjustment in a direction of delaying the phase is considered to be more desirable, as an operation of the inverter, than an operation in which the frequency is set to be low (in a direction of advancing the phase) as compared to the ZVS condition.

Thus, drive is desirably performed with phase delay relative to a resonance point, that is, at a frequency that is slightly higher than a resonance frequency, in the case of driving a resonance circuit in consideration of operation and stability of an inverter as well, Further, the following problem is also conceivable in the case of the power source device according to the present disclosure. That is, since the quality factor is considerably high, slight deviation of the frequency from the resonance frequency disables resonance operation, and thus disables normal operation of the capacitive load or the inductive load.

This problem is a design problem, and it is necessary to take a countermeasure of guaranteeing controllability at the sacrifice of the quality factor to some extent or performing configuring such that change in circuit constant upon change in operation condition and upon deterioration over time becomes allowable.

The power source device according to the present disclosure is applicable to various cases such as cases of utilizing an AC voltage source, an AC current source, series resonance, parallel resonance, an inductive load, a capacitive load, voltage detection, and current detection.

In embodiment 1 to embodiment 8, examples of only some of combinations thereof are shown, but applicability also to other similar combinations is realized.

Regarding use, descriptions have been given mainly for the inductive loads and the capacitive loads. In particular, descriptions have been given focusing on a barrier discharge load such as an ozonizer having characteristic properties owing to electric discharge. However, use for other general capacitive loads and inductive loads can be realized.

Further, applicability also to a resonance-type converter utilizing resonance and non-contact power feeding may be realized.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent parts may be modified, added, or eliminated. At least one of the constituent parts mentioned in at least one of the preferred embodiments may be selected and combined with the constituent parts mentioned in another preferred embodiment.

DESCRIPTION OF THE REFERENCE CHARACTERS 100, 101, 102, 103, 104, 200, 300, 301, 302, 303, 304, 400, 401, 402, 403, 500, 501, 701, 702, 703, 704, 800 power source device
1 AC power source
1A, 1B AC voltage source
12 AC power source
12A, 12B AC current source
2 capacitive load
3 equivalent capacitor
4 equivalent resistor
5 load inductor
6 inductor
7 capacitor
8 inductive load
9 equivalent inductor
10 equivalent resistor
11 load capacitor
13, 13A, 13B, 13C, 13D, 13E control circuit 14 constant voltage source
15 capacitor
16 constant current source
17, 18 inductor
19 voltage detector
20 current detector
21 load circuit
30, 32 full-bridge inverter
31 half-bridge inverter
40 adjustment mechanism
41 adjustment mechanism
50 storage unit
321 load circuit
2a, 2b capacitive load
3a, 3b equivalent capacitor
4a, 4b equivalent resistor
5a, 5b load inductor
8a, 8b inductive load
9a, 9b equivalent inductor
10a, 10b equivalent resistor
11a, 11b load capacitor
5A variable load inductor
11A variable load capacitor
L1 first inductor
Ln−1 (n−1)-th inductor
Ln n-th inductor
C1 first capacitor
Cn−1 (n−1)-th capacitor
Cn n-th capacitor

The invention claimed is:

1. A power source device comprising: a capacitive load having an equivalent capacitor and an equivalent resistor; and an AC power source which applies AC voltage to the capacitive load, the power source device being such that a series circuit composed of a first inductor and a first capacitor is connected to the AC power source, and a series circuit composed of a load inductor and the capacitive load is connected in parallel to one of the first inductor or the first capacitor, or a parallel circuit composed of the first inductor and the first capacitor is connected to the AC power source, and a parallel circuit composed of the load inductor and the capacitive load is connected in series to one of the first inductor or the first capacitor, wherein the power source device has a configuration wherein an inductance of the first inductor is defined as Lp, a capacitance of the first capacitor is defined as Cp, an inductance of the load inductor is defined as Ls, an equivalent capacitance of the capacitive load is defined as Cs, and a frequency of the AC power source is defined as fv, and the following first expression and second expression are satisfied, $$0.8/((2\pi \cdot fv)^2) < Lp \cdot Cp < 1.2/((2\pi \cdot fv)^2)$$

$$0.8/(2\pi \cdot fv)^2) < Ls \cdot Cs < 1.2/(2\pi \cdot fv)^2).$$

2. The power source device according to claim 1, further comprising: an adjustment mechanism which makes variable at least one inductance or capacitance among the inductance of the first inductor, the capacitance of the first capacitor, and the inductance of the load inductor.

3. The power source device according to claim 1, further comprising:
a control circuit which controls the frequency of the AC power source; and
one of
a detection circuit which detects one or both of a voltage and a current of the capacitive load, or
a detection circuit which detects an output voltage and an output current of the AC power source, wherein
in a case of the former detection circuit, the frequency of the AC power source is controlled such that a value of one of the voltage or the current is maximized, and,
in a case of the latter detection circuit, the frequency of the AC power source is controlled such that a phase difference between the output voltage and the output current is minimized.

4. The power source device according to claim 1, further comprising: a control circuit which controls the frequency of the AC power source; and a storage to store therein a relationship between an operation condition of the capacitive load and an optimum value of the frequency of the AC power source, wherein upon start of operation of the power source device or upon change in the operation condition, the frequency of the AC power source is set to the optimum value according to the operation condition.

5. A power source device comprising: an inductive load having an equivalent inductor and an equivalent resistor; and an AC power source which applies AC voltage to the inductive load, the power source device being such that a parallel circuit composed of a first inductor and a first capacitor is connected to the AC power source, and a parallel circuit composed of a load capacitor and the inductive load is connected in series to one of the first inductor or the first capacitor, or a series circuit composed of the first inductor and the first capacitor is connected to the AC power source, and a series circuit composed of the load capacitor and the inductive load is connected in parallel to one of the first inductor or the first capacitor, wherein the power source device has a configuration wherein an inductance of the first inductor is defined as Lp, a capacitance of the first capacitor is defined as Cp, a capacitance of the load capacitor is defined as Cs, an inductance of the inductive load is defined as Ls, and a frequency of the AC power source is defined as fv, and the following first expression and second expression are satisfied, $$0.8/((2\pi \cdot fv)^2) < Lp \cdot Cp < 1.2/((2\pi \cdot fv)^2)$$

$$0.8/((2\pi \cdot fv)^2) < Ls \cdot Cs < 1.2/((2\pi \cdot fv)^2).$$

6. The power source device according to claim 5, further comprising:
a control circuit which controls the frequency of the AC power source; and
one of
a detection circuit which detects one or both of a voltage or a current of the inductive load, or
a detection circuit which detects an output voltage and an output current of the AC power source, wherein
in a case of the former detection circuit, the frequency of the AC power source is controlled such that a value of one of the voltage or the current is maximized, and,
in a case of the latter detection circuit, the frequency of the AC power source is controlled such that a phase difference between the output voltage and the output current is minimized.

7. The power source device according to claim 5, further comprising: a control circuit which controls the frequency of the AC power source; and a storage to store therein a relationship between an operation condition of the inductive load and an optimum value of the frequency of the AC power source, wherein upon start of operation of the power source device or upon change in the operation condition, the frequency of the AC power source is set to the optimum value according to the operation condition.

8. The power source device according to claim 5, further comprising: an adjustment mechanism which makes variable at least one inductance or capacitance among the inductance of the first inductor, the capacitance of the first capacitor, and the capacitance of the load capacitor.

9. A power source device comprising: a capacitive load having an equivalent capacitor and an equivalent resistor; and an AC power source which applies AC voltage to the capacitive load, a series circuit composed of a first inductor and a first capacitor being connected to the AC power source, with "n" being an integer not smaller than 2, a series circuit composed of an n-th inductor and an n-th capacitor being connected in parallel to one of an (n−1)-th inductor or an (n−1)-th capacitor, and a series circuit composed of a load inductor and the capacitive load being connected in parallel to one of the n-th inductor or the n-th capacitor, wherein the power source device has a configuration in which a resonance frequency of the first inductor and the first capacitor, a resonance frequency of a second inductor and a second capacitor, a resonance frequency of the n-th inductor and the n-th capacitor, and a resonance frequency of the load inductor and the capacitive load equal each other, and a frequency of the AC power source matches each of the resonance frequencies.

* * * * *